April 22, 1958 A. C. SCHROEDER 2,831,300

CARTON-HANDLING APPARATUS

Filed May 24, 1954 17 Sheets-Sheet 1

INVENTOR.
ARTHUR C. SCHROEDER
BY D. Emmett Thompson
Attorney.

INVENTOR.
ARTHUR C. SCHROEDER
BY D. Emmett Thompson
Attorney.

April 22, 1958 A. C. SCHROEDER 2,831,300
CARTON-HANDLING APPARATUS
Filed May 24, 1954 17 Sheets-Sheet 3

INVENTOR.
ARTHUR C. SCHROEDER
BY D. Emmett Thompson
Attorney.

April 22, 1958 A. C. SCHROEDER 2,831,300

CARTON-HANDLING APPARATUS

Filed May 24, 1954 17 Sheets-Sheet 4

INVENTOR.
ARTHUR C. SCHROEDER
BY D. Emmett Thompson
Attorney.

INVENTOR.
ARTHUR C. SCHROEDER
BY D. Emmett Thompson
Attorney.

INVENTOR.
ARTHUR C. SCHROEDER
BY D. Emmett Thompson
Attorney.

INVENTOR.
ARTHUR C. SCHROEDER
BY D. Emmett Thompson
Attorney.

April 22, 1958 A. C. SCHROEDER 2,831,300

CARTON-HANDLING APPARATUS

Filed May 24, 1954 17 Sheets-Sheet 8

INVENTOR.
ARTHUR C. SCHROEDER
BY D. Emmett Thompson
Attorney

INVENTOR.
ARTHUR C. SCHROEDER
BY D. Emmett Thompson
Attorney.

April 22, 1958 A. C. SCHROEDER 2,831,300

CARTON-HANDLING APPARATUS

Filed May 24, 1954 17 Sheets-Sheet 10

INVENTOR.
ARTHUR C. SCHROEDER
BY D. Emmett Thompson
Attorney.

INVENTOR.
ARTHUR C. SCHROEDER
BY D. Emmett Thompson
Attorney.

INVENTOR.
ARTHUR C. SCHROEDER
BY D. Emmett Thompson
Attorney.

INVENTOR.
ARTHUR C. SCHROEDER
BY D. Emmett Thompson
Attorney.

INVENTOR.
ARTHUR C. SCHROEDER
BY D. Emmett Thompson
Attorney.

CARTON-HANDLING APPARATUS

Filed May 24, 1954 17 Sheets-Sheet 15

INVENTOR.
ARTHUR C. SCHROEDER
BY D. Emmett Thompson
Attorney.

CARTON-HANDLING APPARATUS

Filed May 24, 1954

17 Sheets-Sheet 16

INVENTOR.
ARTHUR C. SCHROEDER
BY D. Emmett Thompson
Attorney

INVENTOR.
ARTHUR C. SCHROEDER
BY D. Emmett Thompson
Attorney

United States Patent Office 2,831,300
Patented Apr. 22, 1958

2,831,300

CARTON-HANDLING APPARATUS

Arthur C. Schroeder, Skaneateles, N. Y., assignor to Schroeder Machines Corporation, Syracuse, N. Y., a corporation of New York Application May 24, 1954, Serial No. 431,731

23 Claims. (Cl. 53—63)

This invention relates to carton handling machines, and more particularly to a machine adapted to expand collapsed cartons for filling, and thereafter seal the filled cartons.

The present invention is directed to a machine for selecting, one at a time, a collapsed carton from a stack, expanding such carton as it approaches a filling station into position for lateral filling, and thereafter sealing the flaps thereof as the carton is advanced beyond said station. The invention further has to do with the utilization of a single reciprocating bed or carriage, preferably compressed air operated, such bed moving from a position beneath a stack of cartons through a carton selecting movement, and thereafter advancing in a single forward stroke, during which the selected carton is carried from beneath the stack to a carton expanded and filling station, such carton being expanded as it moves into the filling station, and as the forward stroke is completed. The invention further has to do with provision upon each successive forward stroke, for advancing the filled carton from the filling station through a sealing operation while simultaneously advancing the succeeding collapsed carton through the expanding process into the expanded filling station position. Further, the invention has to do with the utilization of the return stroke for positively selecting a collapsed carton from the stack and placing such carton in readiness for advancing in the manner set forth.

A further feature of the invention is the utilization of a flap of the carton for forming a temporary flange for accurately locating the carton laterally of the bed, while providing shoulders for engaging the folded edge of the carton for the positive advance of the carton accurately positioned upon the bed.

Further features of the invention have to do with breaking the vacuum within the collapsed carton preparatory to expanding to filling position, as well as mechanism for closing and subsequently sealing the flaps as the cartons advance beyond the filling station.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figures 24 to 34 inclusive are a series of perspective views in the nature of a flow sheet illustrating the various operations the machine performs to expand and seal the flattened cartons.

Figure 1:
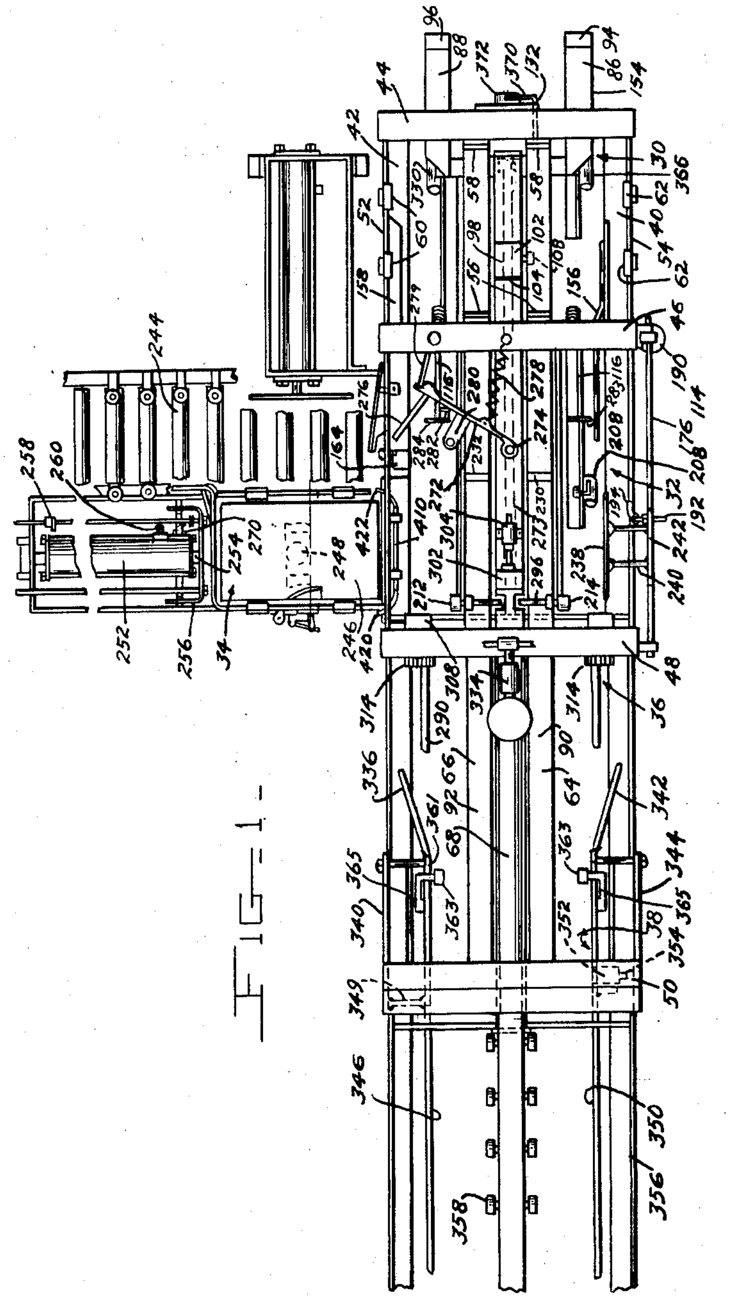
Figure 1 is a top plan view of the machine, with the filled carton conveyor broken away.

In Figure 1, there is shown a carton hopper generally indicated at 30, in which collapsed cartons are stacked and from which the cartons are removed from the bottom one at a time. There is further shown a carton expanding station generally indicated at 32, a carton filling mechanism as at 34, and a carton flap gluing and forming station generally indicated at 36, followed by a conveyor and flap glue setting press mechanism generally indicated at 38. The apparatus comprises a frame having spaced longitudinal angle members 40 and 42, extending substantially the length of the machine to which are secured transverse frame members 44, 46, 48, and 50, the transverse members 44 and 46 defining with side rails 52 and 54 and vertical guides 56, 58, 60 and 62, a hopper of approximately the dimensions of the collapsed cartons supplied to the machine.

Extending from the transverse frame 44 to the frame 50 are a pair of central rails 64 and 66, upon which is slidably mounted a reciprocating carriage which is adapted to be moved from beneath the hopper and to the rear thereof, for selecting a carton from the hopper and thereafter to be moved forward to the carton expanding and filling station. The reciprocal movement of the carriage is powered by an elongated double-acting air cylinder 68.

Figure 12:
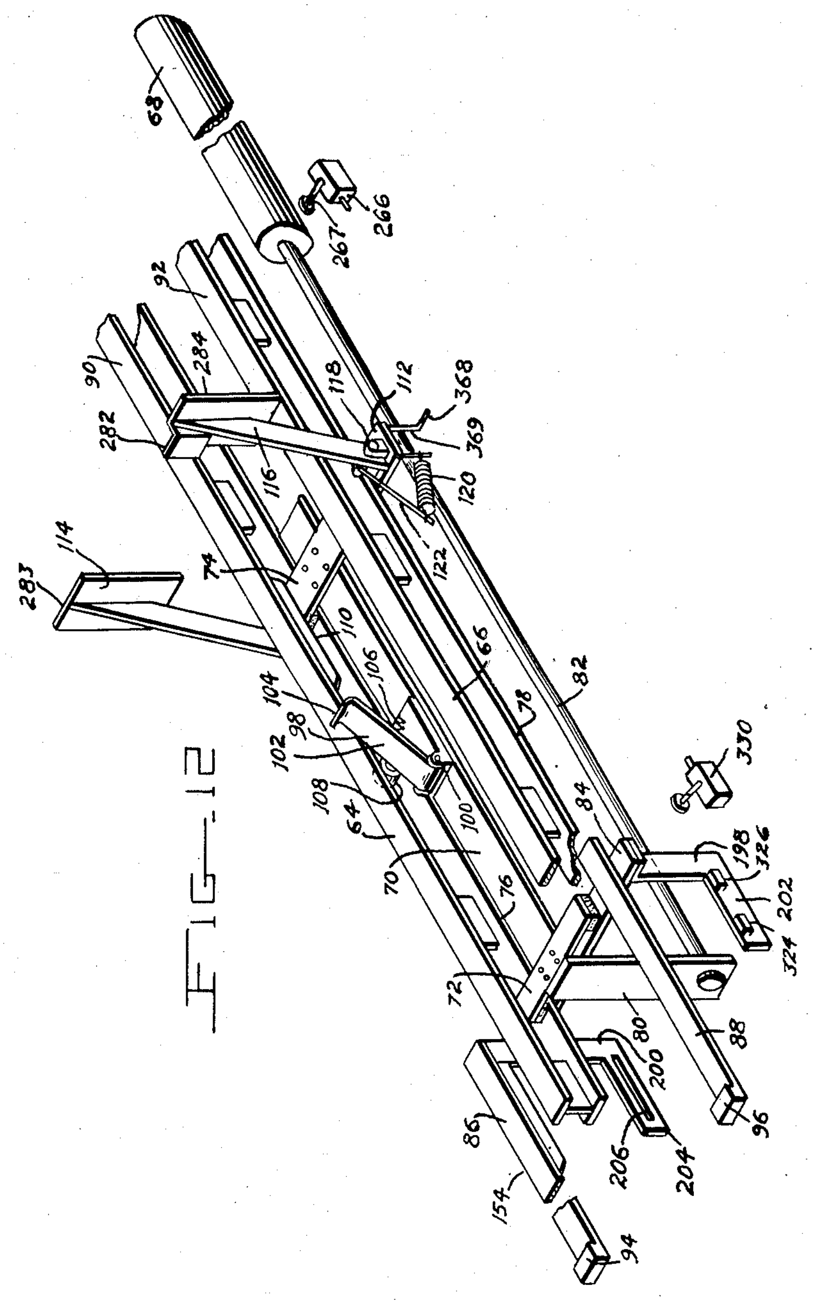
Figure 12 is a fragmentary perspective view illustrative of the machine carriage.
Figure 20:
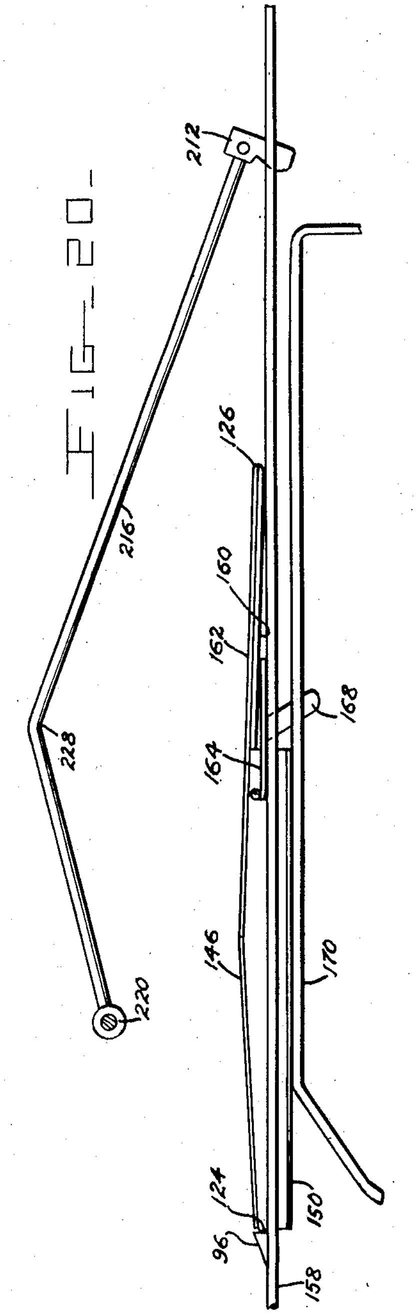
Figure 20 is a diagrammatic side elevational view of a collapsed carton approaching the expanding station and about to be initially spread.

As shown diagrammatically in Figure 12, the carriage comprises a main central member 70 having transverse slides 72 and 74 at opposite ends, which slide upon the lower flanges 76 and 78 of the rails 64 and 66. The end of the central member 70 adjacent the slide 72 is provided with a depending arm 80 to which is attached the piston rod 82 leading to the piston 69 in the cylinder 68. Extending transversely underneath the flanges 76 and 78 and secured to the carriage 70 beneath the slide 72 is a cross bar 84 which extends laterally beyond the rails 64 and 66. On the ends of such cross bars are mounted a pair of spaced carton support arms 86 and 88, the upper surfaces of which lie in the plane of the upper flange surfaces 90 and 92 of the rails 64 and 66.

The arms 86 and 88 are provided with carton edge engaging shoulders 94 and 96 and the central carriage member 70 is provided with an upwardly resiliently urged carton selector hook 98, such hook being pivoted at its lower end as at 100 and having a camming face 102 adapted to engage the forward under edge of a collapsed carton and a curved hook end 104 adapted to nicely engage the forward edge of a single carton. The selector is upwardly urged as by a coil spring 106 and carries a laterally disposed cam roller 108 riding beneath the flange 90 of the rail 64, such roller being adapted to engage during a portion of the stroke of the carriage, a cam bar 110 adapted to depress the selector so that the hook 98 thereof will ride below the surfaces of the flanges 90 and 92, and thereby clear a carton resting upon the flange surfaces 90 and 92 of the rails 64 and 66 when the carriage is moving in its return stroke.

Beneath the transverse slide 74 is a cross bar 112 also secured to the carriage, such cross bar being located below the rails 64 and 66 and extending to either side thereof. Upon the extremities of the cross bar on opposite sides of the rails 64 and 66 are retractible pusher shoes 114 and 116. Each of said shoes are pivotally mounted upon the bar 112 as at 118 and each of said shoes are resiliently held in the erected position indicated in Figure 12 by means comprising a tension spring 120, acting upon an arm lever 122 fixed for rotation with respect to one or the other of the shoes 114 and 116. The shoes 114 and 116, as shown in Figure 12, are adapted to be rocked to a depressed position beneath the flanges 90 and 92 of the rails 64 and 66 upon the return stroke of the carriage 70 when engaging a carton in the filling station resting on the flanges 90 and 92 of the rails 64 and 66.

Figure 13:
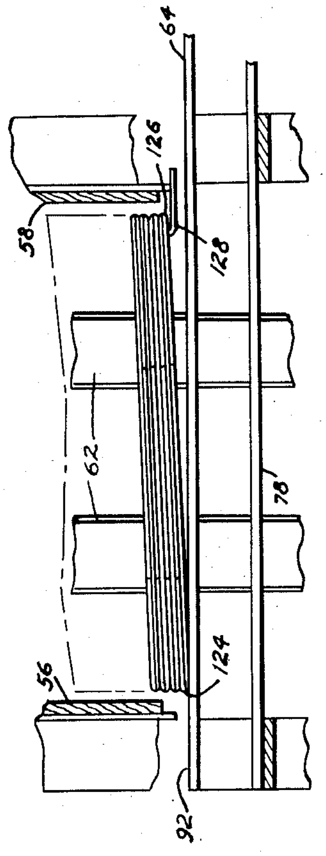
Figure 13 is a sectional view through the carton hopper showing collapsed cartons awaiting individual selection.
Figure 14:
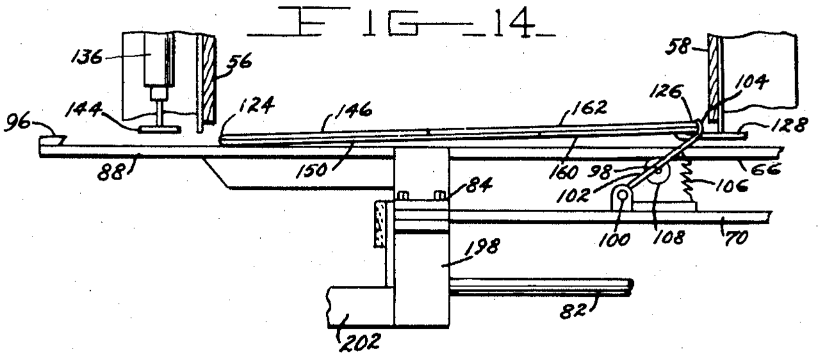
Figure 14 is a diagrammatic sectional view of a collapsed carton showing the carton selector in engagement with the forward edge thereof.
Figure 17:
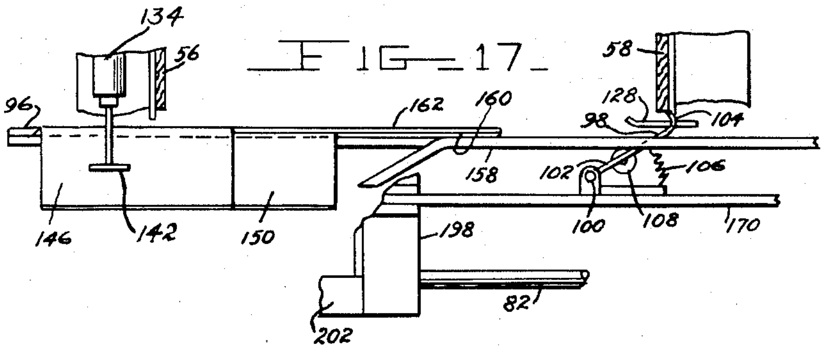
Figure 17 is a diagrammatic sectional view similar to Figure 16 showing the right rear flaps also broken.

The carton selecting operation of the machine, in respect to which reference is made to Figures 13 and 14 particularly, is adapted to act upon a stack of collapsed cartons placed within the hopper, which cartons take substantially the position shown in Figure 13. The cartons are stacked with their flaps extending laterally and the rearward folded edge of the lowermost carton 124 rests upon the upper flanges 90 and 92 of the rails 64 and 66, while the forward edge of the lowermost carton 126 rests upon a pair of rearwardly facing spaced support feet 128 and 130 (see Figures 5 and 15). The forward and rearward stack guides 56 and 58 extend downwardly short of the distance to the flanges 90 and 92, so as to permit a single collapsed carton to slide from beneath the stack rearwardly thereof on the flanges 90 and 92 of the rails 64 and 66.

Figures 24, 25, 26, 27, 28, 29:
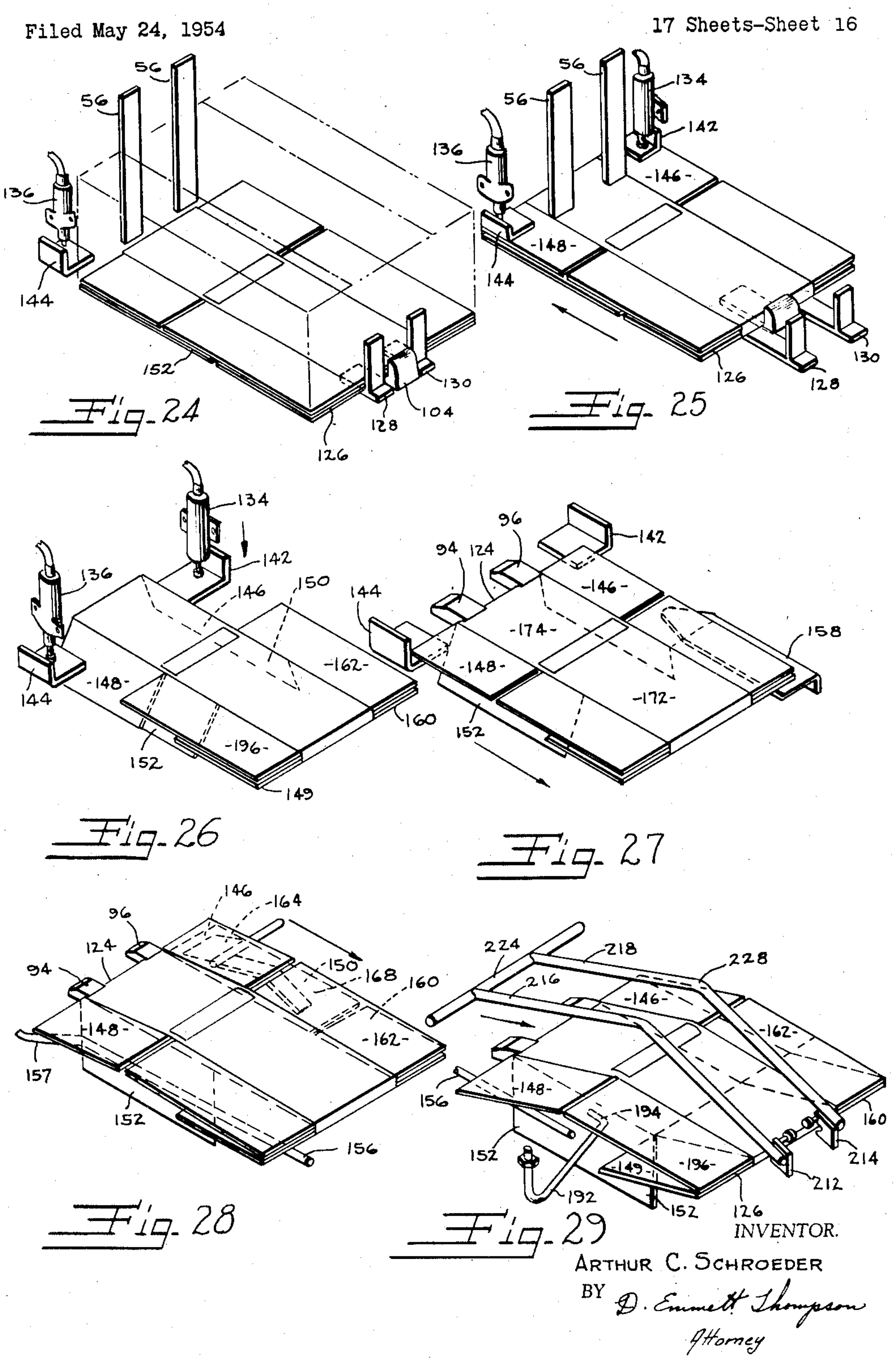
Figure 30:
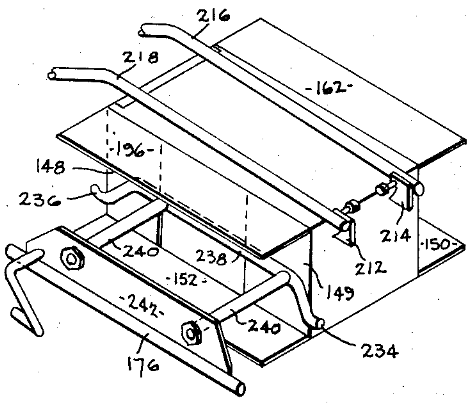
Figure 31:
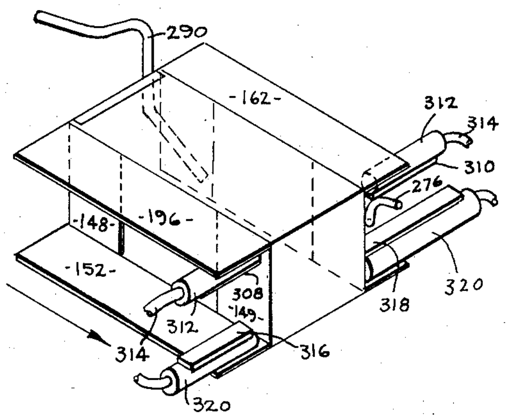
Figure 32:
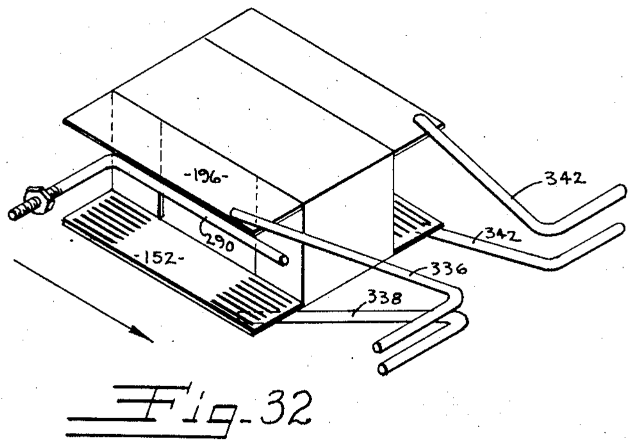
Figure 33:
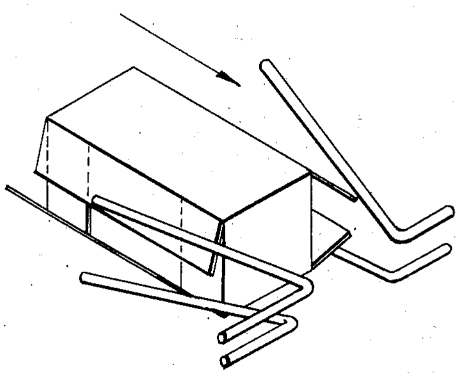
Figure 34:
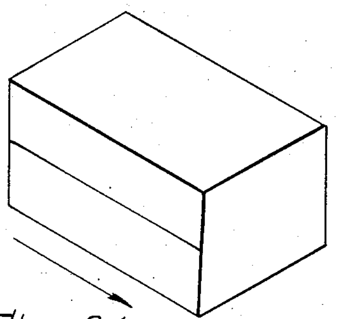

Upon the rearward movement of the carriage, and particularly toward the end of such movement, the carton selector engages the forward edge 126 of the bottommost carton intermediate the spaced supporting feet 128 and 130, and the surface 102 of the selector is cammed downward against the urge of the compression spring 106 so that the hook end 104 of the selector neatly fits around the forward edge 126 of the bottommost carton, causing such bottommost carton to be moved rearwardly to the position shown in Figure 14, with the forward edge 126 of the carton having been slid off the supporting feet 128 and 130. The rearward portion of the carton has thus been moved rearwardly as indicated in Figures 15, 24 and 25.

Figure 15:
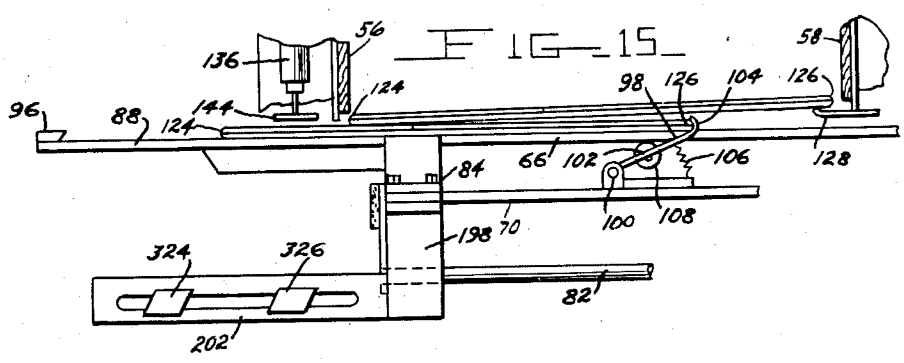
Figure 15 is a diagrammatic sectional view showing a selected collapsed carton moved by the carriage to the end of its return stroke.
Figure 16:
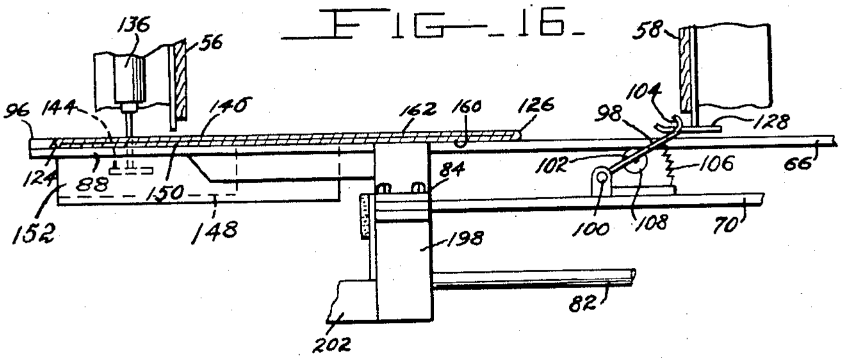
Figure 16 is a diagrammatic sectional view showing a collapsed carton, also in section, to show its left rear flaps broken, ready for forward movement, after forward movement of the carriage has commenced.
Figure 18:
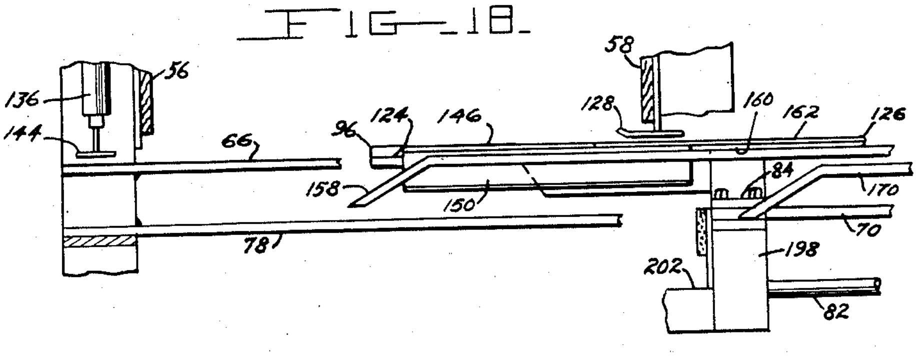
Figure 18 is a sectional view showing the collapsed carton at an intermediate position in respect to its travel toward the expanding and filling station.

When a carton has been moved by the carriage to the position shown in Figure 15, which corresponds to the end of the rearward movement of the carriage, such carton engages a valve-actuating lever 132, which is effective to open a valve in the air supply pressure line, so that certain functions may be performed pertaining to the filling of an open carton at the filling station, following which the air cylinder 68 is energized and thereafter causes the carriage to move on its forward stroke. The end of the air cylinder that is energized for the purpose of effecting a forward stroke is connected to a pair of flap breaking cylinders 134 and 136, located on the transverse frame 44 and immediately inside of the uprights 138 and 140 thereof. Such cylinders actuate pressure pads 142 and 144, which are adapted to bear upon the upper rearward flaps 146 and 148, which have been exposed from beneath the stack by having been moved to the position shown in Figure 15. The flaps 146 and 148, when depressed, bear upon and bend downwardly the longer rearward flaps 150 and 152, the rearward portion of which underlies the flaps 146 and 148 (see Figures 27 and 38).

The width of the spaced carton support arms 88 and 86 is chosen substantially the same as the length of the body portion between flaps of the cartons to be processed in the machine, so that by bending the flap 152 downwardly at right angles and guiding the same through the machine so formed, there is provided an angular shoulder adapted to engage the edge 154 of the arm 86, (see Figure 5) and thereby position the carton laterally with respect to the carriage during its passage forward along the flanges 90 and 92. When air pressure is applied to move the carriage forward, the breaker cylinders 134 and 136 are immediately energized so that the flaps are broken prior to the shoulders 94 and 96 engaging the rear edge of the carton to move the same forward with the carriage. Once the shoulders 94 and 96 engage the rearward edge of the collapsed carton 124, the carton is propelled forward from beneath the stack, the carton passing beneath the feet 128 and 130. Upon the carton passing outward from beneath the hopper, the next carton drops into place in readiness for selection, with its rear edge resting on the flanges 90 and 92.

As the collapsed carton approaches the expanding station, means are provided for initially breaking the vacuum within the carton, such means acting to directly spread the collapsed wals apart, so that upon the application of pressure between the forward edge 126 of the carton and the rear edge 124, the carton is moved through a parallelogram stage to the expanded rectangular carton shape in readiness for filling.

The carton, upon its forward feed from the hopper position, is held in position upon the arms 86 and 88, the left hand rearward flap 152 being held in a downwardly directed position over the edge 154 of the arm 86 so as to engage beneath and inside of a giude 156. The guide is offset as at 157 inwardly to bend the flap to a depending vertical position, as the carton is moved forward through the machine. The right hand rearward lower flap is caused to pass beneath an inwardly directed flange 158 extending along the side of the machine and lying substantially in the plane of the upper surfaces of the flanges 90 and 92 of the rails 64 and 66. The remaining three flaps on either side, as the carton is fed forward, are allowed to extend laterally, the pressure upon the rearward upper flaps 146 and 148 being relieved as soon as the carton moves appreciably forward, and from beneath the pads 142 and 144 of the flap breaker cylinders 134 and 136. The three flaps on the right hand side pass above the side flange 158.

As the collapsed carton approaches the expanding position, the upper three flaps 160, 162 and 146 ride over a hinged plate 164 pivoted to one side as at 165, (see Figure 22) in a bearing 166, disposed laterally beyond the edge of the flaps. The plate 164 overhangs the flange 158 inwardly, and is provided with a depending inclined arm 168 extending into the path of the oncoming lower right rear flap 150, disposed below the flange 158. Such lower flap 150 is supported against downward deflection by a guide rod 170 supported in any suitable manner and extending lengthwise beneath the flange 158 and as the carton is moved forward, the flap 150 engages the arm 168, rocking the plate 164 on its pivot to the approximate position shown in Figure 21, so as to exert an upward force upon the flaps 162 and 146, thus lifting the side walls 172 and 174 of the carton and tending to break the vacuum therewithin (see Figure 28).

As the carton is progressing through the stage just described, provision is also made for exerting an upward pressure upon the left hand upper flaps of the carton so as to further lift the upper side walls 172 and 174 of the carton, causing the same to take a parallelogram shape. For this purpose, there is provided a longitudinally extending rock shaft 176 journaled in bearings 178 and 180 on the side members 182 and 184 of the transverse frame 46 and 48 (see Figure 8). Such rock shaft is actuated by a crank arm 186 connected to a piston rod 188 extending into a double acting air cylinder 190. Rigidly secured to the shaft 176 is an arm 192, the free end 194 of which is adapted to swing upwardly underneath the upper left hand flaps 196 and 148, the under surfaces of such flaps being exposed by reason of the flap 152 being held in a depending right angle bend with respect to the guide arm 86, as previously described, by the guide 156. The under surfaces of the flaps 196 and 148, being exposed, may be struck by the flap-engaging head 194 of the arm 192 when the rock shaft 176 is rotated in the direction of the arrow A in Figure 8, through introduction of air pressure into the upper end of the cylinder 190 (see Figures 29 and 30).

Depending from the cross bar 84, upon which the guide bars 86 and 88 are mounted, are spaced brackets 198 and 200 having rearwardly extending cam carrying arms 202 and 204, having cams for actuating valves to control various operations during the forward movement of the carriage. For example, the cam 206 on the arm 204 is adapted to actuate a valve 208 through a roller follower 210 when the carriage has moved the carton to the approximate position shown in Figure 21, the valve 208 being connected in circuit with the upper end of the air cylinder 190 whereby the rock shaft 176 is rotated to swing the carton breaking head 194 into engagement with the flaps as described.

Figures 2, 8:
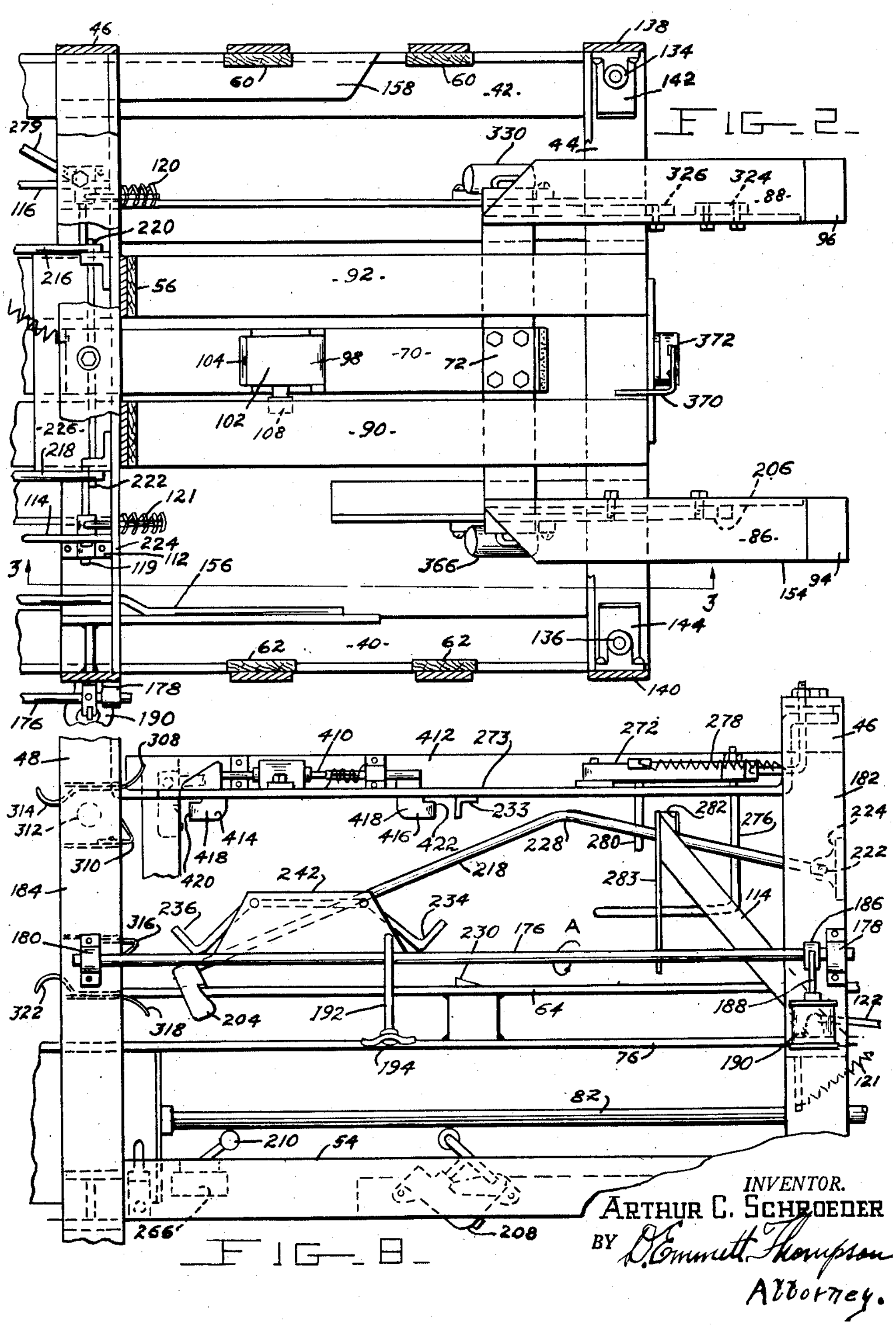
Figure 2 is a plan view enlarged of the hopper and carton selecting end of the machine.
Figure 8 is a left side elevation of the expanding and filling position of the machine taken from the same side as Figure 3.
Figure 3:
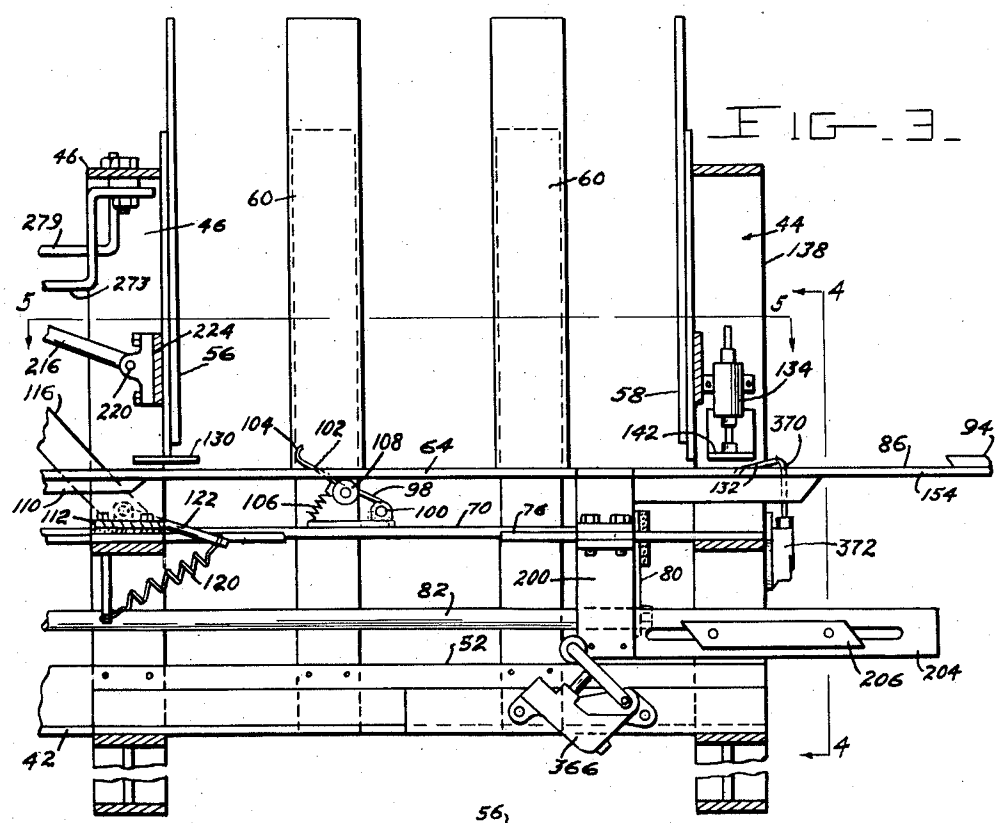
Figure 3 is a left side sectional view of the hopper and selecting end of the machine, taken substantially on the line 3—3 of Figure 2.
Figure 4:
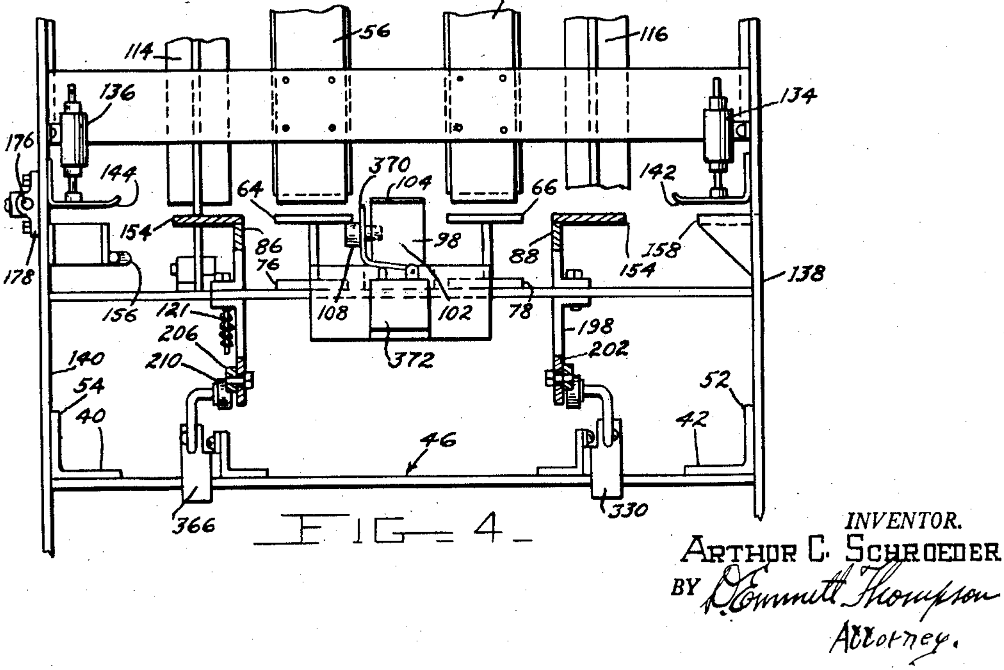
Figure 4 is an end elevational view of the machine as seen from section line 4—4 of Figure 3, taken through the extended carriage.
Figure 21:
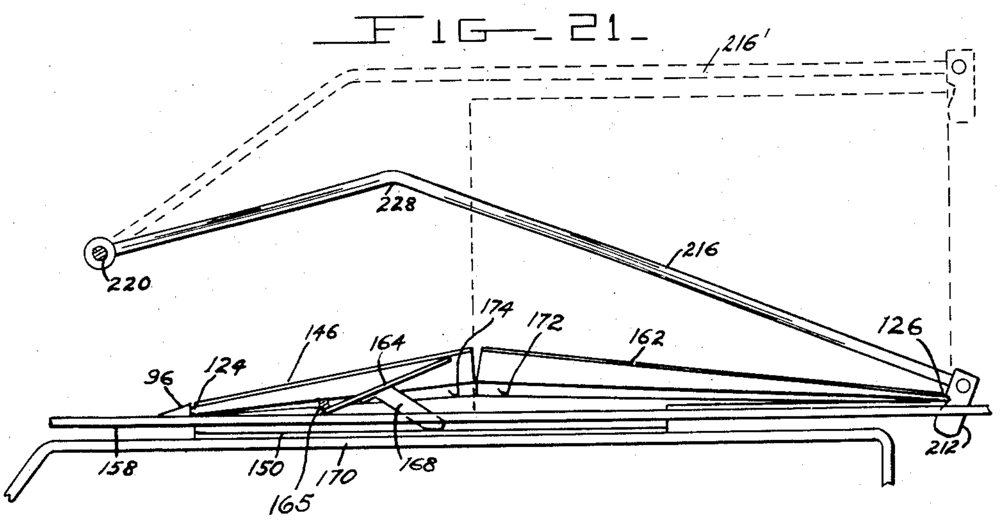
Figure 21 is a side elevational view similar to Figure 20, showing the carton advanced to the expanding station and the carton breaking mechanism operating to partially spread the carton.
Figure 22:
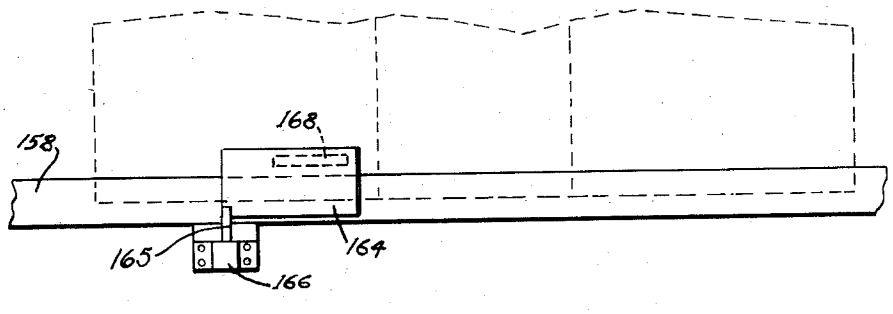
Figure 22 is a fragmentary plan view of the carton breaking mechanism.

The forward edge 126 of the carton engages the laterally spaced feet 212 and 214 of a tong mechanism formed by spaced bars 216 and 218 pivotally mounted on transverse pivots as at 220 and 222, mounted on the transverse member 224 in the frame member 46. Such bars are tied together for uniform motion by a plate 226 extending between the tong bars 216 and 218 adjacent their pivoted ends. The pivot of the tong bars, as is shown in Figure 8, is located at a height above the flanges 90 and 92 approximately half that of the erected vertical dimension of the expanded carton,, and such bars have a knee bend as at 228 to clear the carton when expanded, so that when the forward edge 126 of the carton engages the shoes 212 and 214 of the tong assembly, and the shoulders 94 and 96 continue to propel the rearward edge 124 of the carton forward, the carton as is indicated in Figure 21, will be free to expand to the rectangular shape there indicated, the tong assembly being lifted to the position shown in dotted, for example, as at 216'. The rearward edge 124 of the carton, when the carton has been expanded to the rectangular shape, rides over holding wedge-shaped chock blocks 230 and 232 upon the flanges 90 and 92 (see Figure 6), while the upper rear corner engages an angle member 233. The carton is thus held in erected position and prevented from collapse and moving backward when the carriage moves in its return stroke.

When the carriage reaches the end of its forward stroke, a valve actuating arm 368 carried on the carriage cross member 112 moves the actuating arm 267 of the valve 266, whereupon the forward movement end of the cylinder 68 is exhausted and air under pressure is supplied to the opposite end for return movement.

As the carriage reaches the end of its forward motion and the carton has been expanded approximately to a rectangular shape, the cam 206 passes beyond the follower 210 of the valve 208, thereby exahusting the upper end of the double-acting cylinder 190. When pressure is applied to the cylinder 68 for the return stroke, pressure is admitted also to the lower end of the cylinder 190 through a connection to the line feeding cylinder 68 to actuate the rock shaft 176 reversely, swinging the arm 194 away from the collapsed carton vacuum breaking position and bringing the forming ends 234 and 236 of the side flap-engaging bar 238 into engagement with the side flaps 148 and 149 of the left hand side of the carton, whereby to close said flaps. The bar 238 is supported upon bracket members 240 extending to a wing plate 242, welded to the shaft 176. It will appear from Figure 6 that when the bar 238 reaches the normal end position of its rocking motion, the forming ends 234 and 236 which close the flaps as it swings into the end position, all lie in a common vertical plane whereby the bar 238 acts to hold the flaps closed during filling and to guide the carton when advanced from the filling position while holding the side flaps closed (see Figures 7 and 30). The bar further resists side thrust during carton loading.

Figure 9:
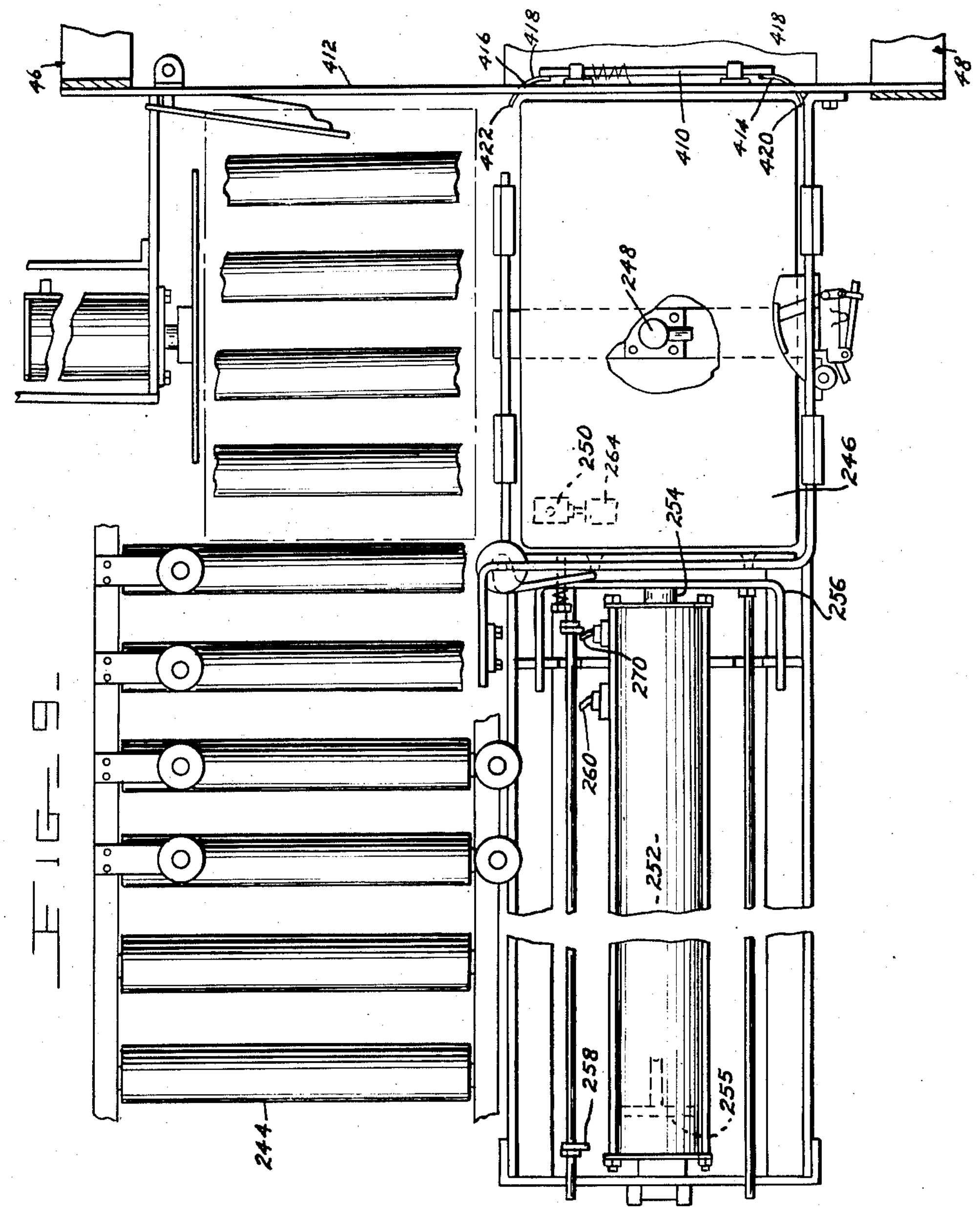
Figure 9 is an enlarged plan view of the carton filler mechanism shown on the right side of the machine at the filler station in Figure 1.
Figure 10:
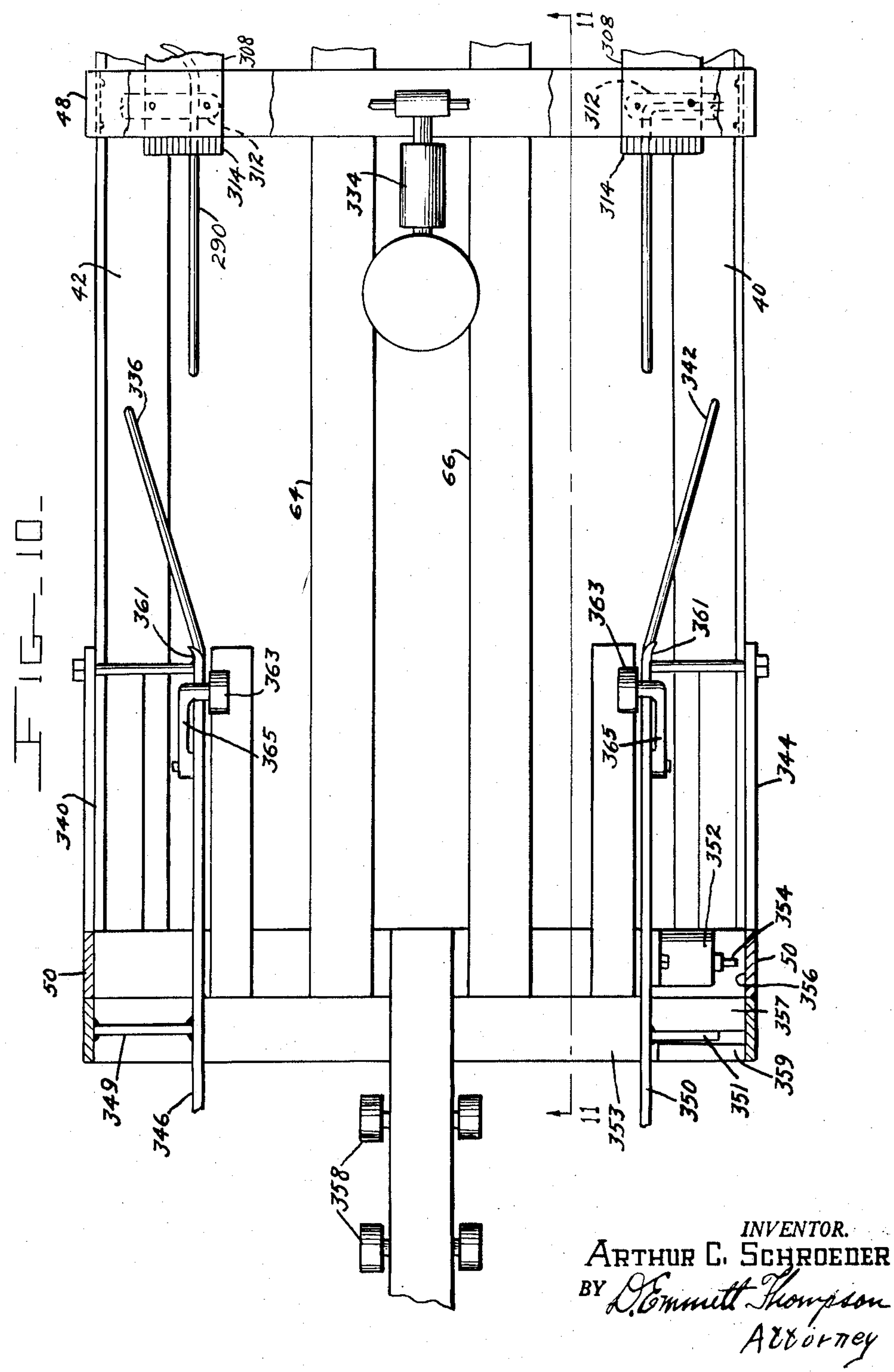
Figure 10 is an enlarged plan view of the flap gluing forming and glue setting press portion of the machine.
Figure 11:
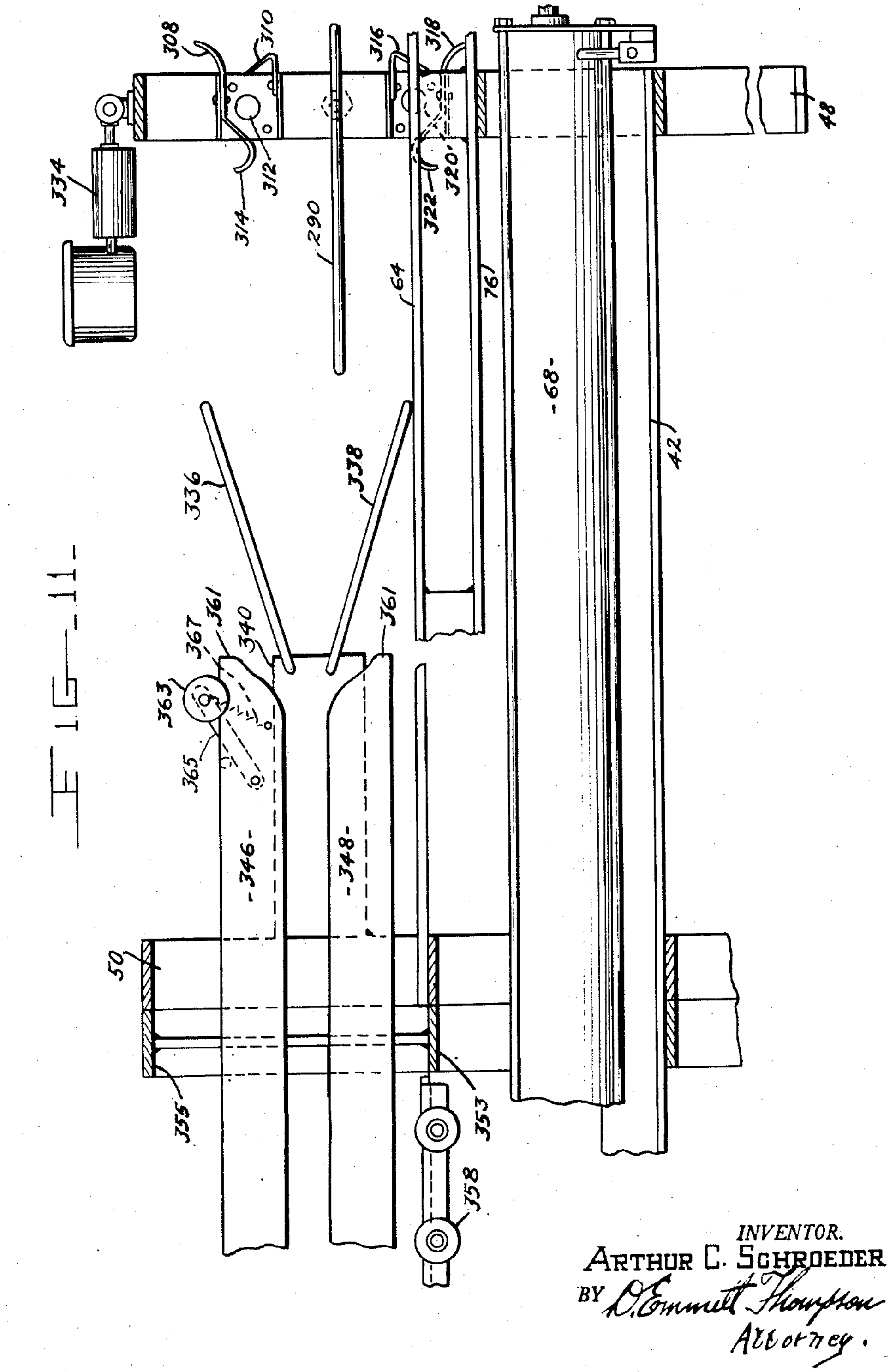
Figure 11 is a sectional view of the flap gluing forming and glue setting press portion of the machine taken substantially on the line 11—11 of Figure 10.

The right hand side of the carton remains open for side filling by apparatus such as is indicated in Figure 9. The upper and front and rear side flaps 162, 160 and 146 respectively of the right hand side of the carton are held open and flared slightly outwardly to provide a funnel effect by a flap deflector mechanism. The flap deflector comprises a bar 410 pivoted on the inside face of an upper frame member 412, from which depend flared members 414 and 416, which extend into the path of, and are adapted to be engaged by a load being propelled into the open carton. The load swings the members inwardly and upwardly and the faces 418 engage the outer edge of the top flap 162 to lift the same, while the flared ends 420 and 422 engage and spread the outer edges of the side flaps 146 and 160, thereby clearing the path for the load to enter the awaiting carton.

The carton-filling mechanism comprises a roller conveyor 244 along which articles are fed to an elevator loading platform 246, such platform being supported by a compressed air cylinder 248. As a layer of articles is positioned upon the platform 246, such platform is depressed by mechanism well understood in the art but not necessary to be shown in detail herein, whereupon a subsequent layer is reposed upon the previous layer. When a full carton load is positioned on the elevator platform and the platform depressed to its lowermost position, a valve 250, actuated in response thereto, is tripped to admit air under pressure to the outer end of the carton loading cylinder 252, whereupon the piston 255 and piston rod 254 drives the plate 256 toward the right hand open end of the carton and slides the load lying upon the platform across the flange 158, acting as an apron as at 161, and into the carton. It will be realized that the apparatus may be provided with a carton filling mechanism to fill cartons either from the right hand side, as shown in Figures 1 to 23, viewed in direction of the movement of the cartons; or from the left hand side, as is illustrated in Figures 24 to 34, viewed in the direction of the movement of the cartons.

Figure 23:
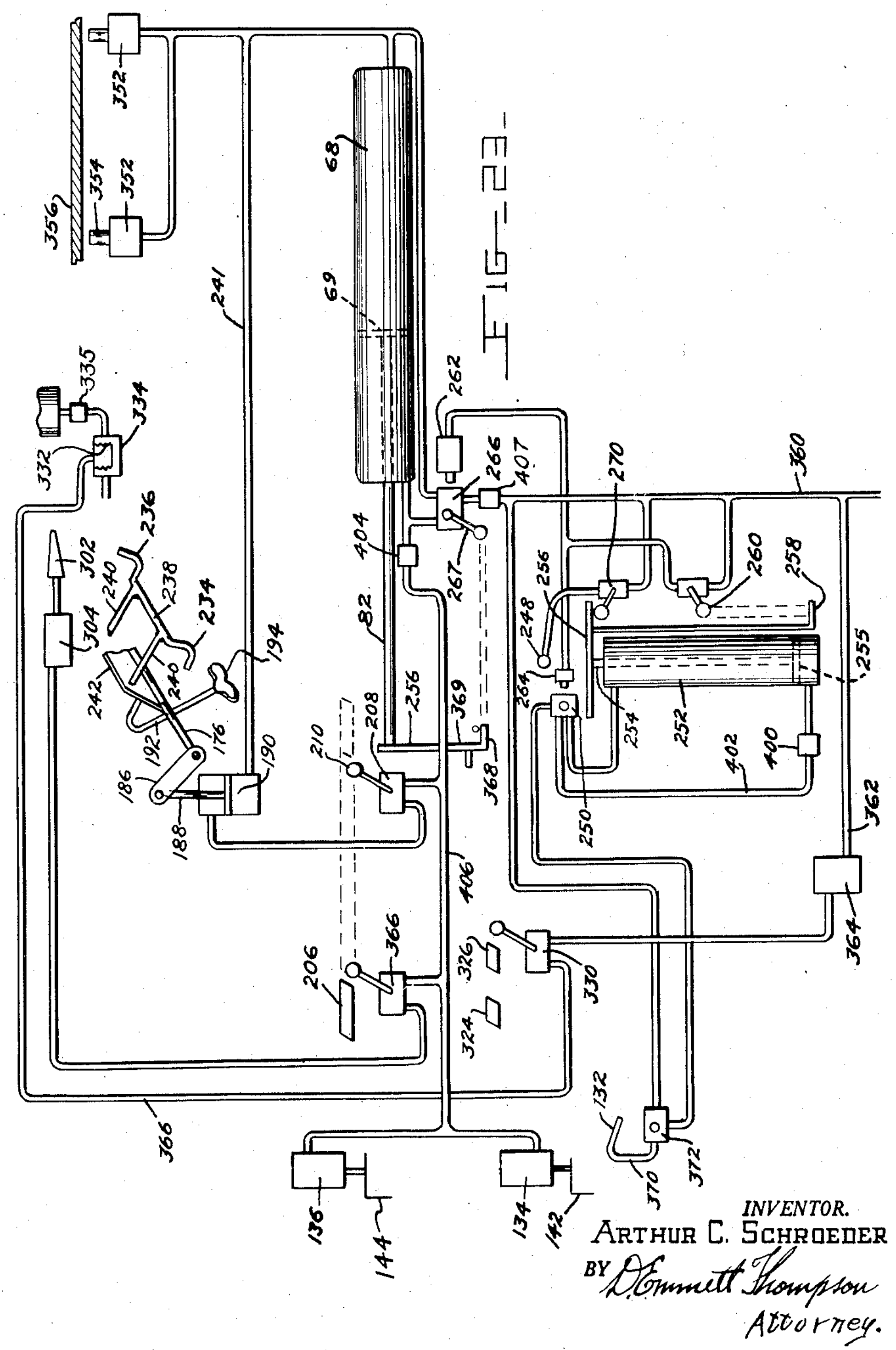
Figure 23 is a diagrammatic view of the air pressure actuating system of the machine.

It will be observed from Figure 23 that the valve 250 is supplied from a compressed air supply 360 by a series circuit, in which the carton sensing valve 372 is placed. If no carton has been selected on the carriage return stroke, the arm 132 is not depressed and the valve 372 remains closed, and the carton loading operation cannot proceed.

When the valve 372 is open, and the valve 250 is tripped by a full carton load of merchandise on the platform and the plate 256 commences to move, the valve 270 is actuated to exhaust the cylinder 248 of the platform elevator, so that the air support for the platform during the carton-loading stroke is relieved, and the platform rests at its low position. When the merchandise is set into the open carton, and the piston 255 reaches the end of its loading stroke, a piston actuated hand 258 opens a valve 260, sending air pressure to the valve operating cylinders 262 and 264. The cylinder 262 operates the valve 266, to initiate forward travel of the carriage and the operating cylinder 264 actuates the valve 250, which admits air pressure to the inboard end of the cylinder 252 and causes retraction of the carton load propelling plate 256. When the piston 255 returns to the position shown, for example, in Figures 9 and 23, with the plate 256 retracted, the valve 270 is thereby actuated to admit air pressure to the elevator platform cylinder 248, thereupon lifting the platform 246 to the uppermost position in readiness for reloading of the platform.

Figure 6:
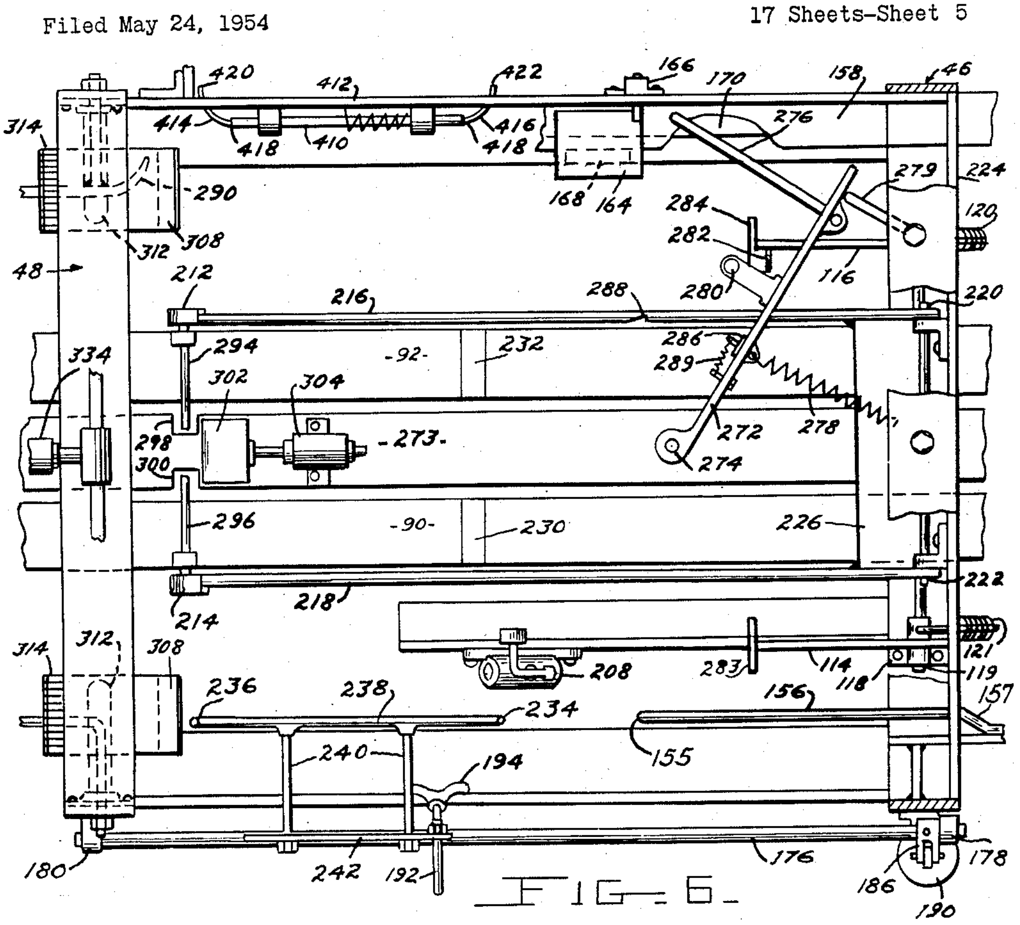
Figure 6 is a top plan view with parts broken away of the carton expanding and filling station position of the machine.
Figure 19:
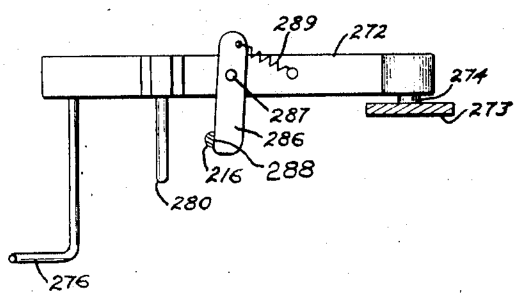
Figure 19 is a fragmentary diagrammatic view of the lock for the flap closing arm.
Figure 7:
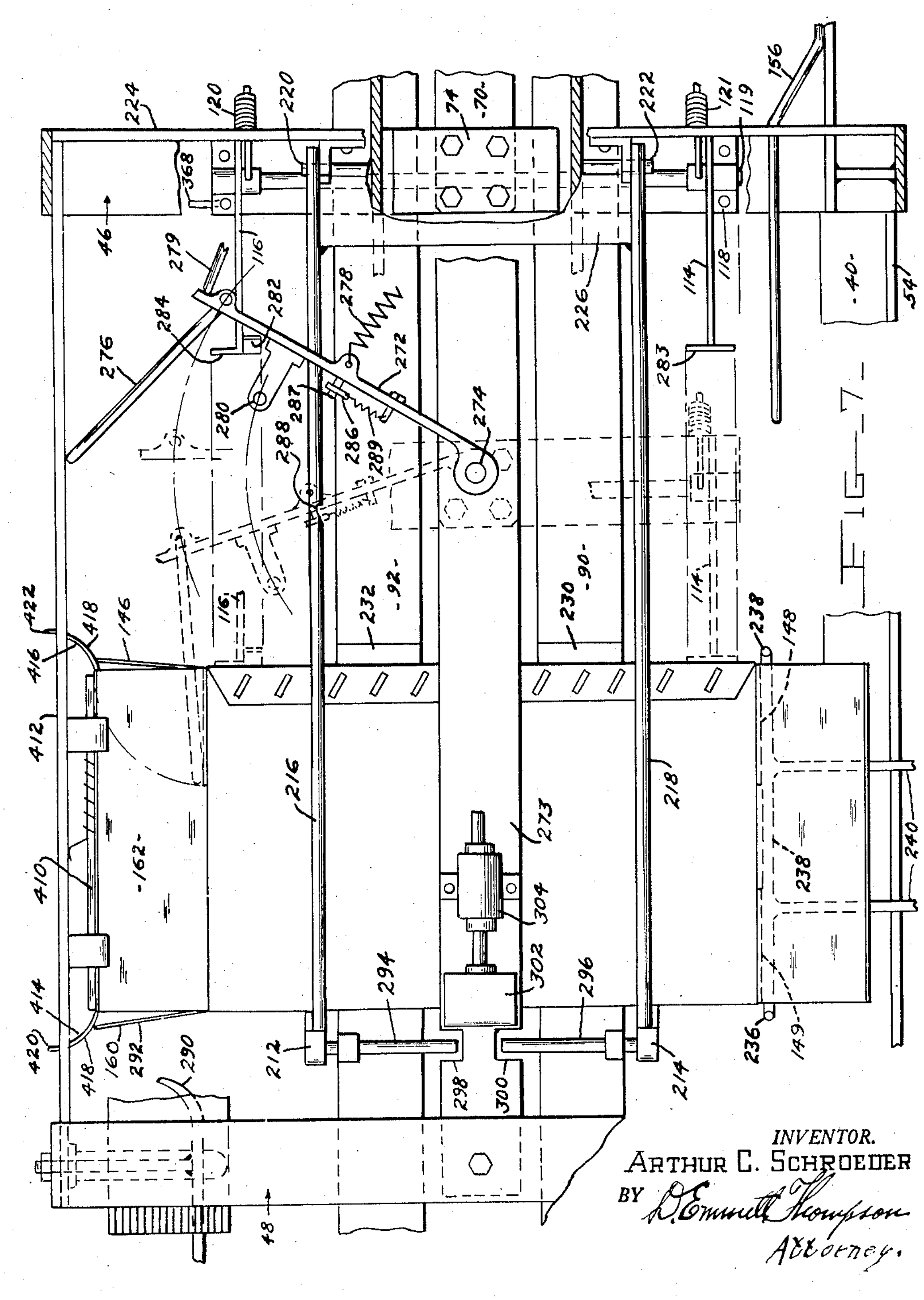
Figure 7 is an enlarged plan view of the expanding and filling position of the machine, showing an expanded carton at the filling station.

Upon the rearward stroke of the carriage, the pusher pedals 114 and 116 rock upon their pivots 118 and 119, whereby the pusher pads 114 and 116 ride beneath the erected carton until the carriage moves rearwardly a sufficient distance for the plate extremities thereof 283 and 284 to clear the carton, whereupon the coil springs 120 and 121 act to raise the pushers 114 and 116 to the position indicated in Figures 6, 7, and 12. On the return stroke of the carriage, the cam 206 rides beneath the follower 210 rendering the valve 208 inactive, and the upper end of the cylinder 190 is thereby connected to exhaust, while the lower end is under pressure, derived from the return stroke end of the carriage actuating cylinder 68. As the carriage moves rearwardly, the carton selector 98 engages the forward edge of the next carton on the bottom of the stack, the flat portion 102 camming against the edge to cause the hook end 104 of the selector to be depressed, so as to neatly engage the forward edge of the carton, and upon further rearward travel of the carriage, such carton is moved rearwardly to the position indicated in Figure 15. When so disposed, the carton opens the valve 372, so that the subsequent carton loading operation may proceed when valve 250 is actuated. When loading has been effected and valve 260 shifted, the carriage commences its forward stroke, and the loading cylinder commences the return stroke.

Thereafter, and upon each forward movement of the carriage, the shoe 116, prior to engagement with the filled carton, actuates a right hand rear flap-closing lever arm 272, which arm is pivoted upon the fore and aft extending centrally disposed member 273 extending between the transverse frames 46 and 48 at a suitable height above the expanded carton. Such flap-closing arm 272, pivoted as at 274, carries a flap-engaging bar 276. The lever arm 272 is resiliently biased by a tension spring 278 to its retracted position as shown in Figures 6 and 7, where it engages an abutment 279. The arm is provided with an elongated depending lug 280 extending into the path of an offset 282 in the pad 284 of the pusher 116, so that as the pusher 116 moves forward, the lever arm 272 is swung towards the carton, the filling of which has just been completed, and the bar 276 engages the opened rearward side flap 146 (see Figure 7) of such carton, hinging the flap closed. The arc through which the lever 272 swings is so chosen that the lug 280 moves inwardly so as to disengage from the offset 282, when swung to flap-closing position.

When the lever arm 272 is swung to the flap-closing position, a lock lever 286, pivoted thereon as at 287 and biased by a spring 289 depends so as to engage a notch 288 in the tong bar 216, whereby return movement of the lever arm 272 is prevented. When so held, the flap-closing bar 276 extends across the end of the carton with its closed rear side flap 146, and acts as a guide as the carton is subsequently advanced by the engagement of the pusher members 114 and 116 therewith. The flap 146 is held closed by the bar 276 until the carton reaches a further flap guide member 290, which in the advancing motion of the carton first acts to close the forward side flap 292, thereafter holding such flap closed while subsequently engaging the closed rear side flap to also hold such flap closed.

In order for the carton to advance from the filling position, it is necessary to lift the carton-forming tong levers 216 and 218 and the feet 212 and 214 out of engagement with and clear of the forward edge of the carton, and for this purpose, the tong bars are provided with elongated studs 294 and 296, which extend toward one another, the approaching ends of which, however, are spaced and adapted to pass through opposite side notches 298 and 300 in the member 273. Mounted on the top of the member 273 is a wedge-like cam 302 actuated by a cylinder 304, such wedge being adapted to be moved by the cylinder so as to engage the studs 294 and 296 and lift the tongs 214 and 212 sufficiently to clear the top surface and forward corner of the carton preparatory to advancing the carton beyond the filling position. The cylinder 304 is actuated by pressure controlled by the valve 366, such valve being actuated by the cam 206. The cam 206 is so disposed as to actuate the valve as the pushers 114 and 116 approach the carton immediately before engaging the carton for the purpose of advancing the carton beyond the filling position. The cam is of sufficient length to hold the valve 366 open long enough to hold the tong levers and feet 212 and 214 clear while the forward edge of the carton advances beneath the feet, after which the valve may be closed, the cam retracted and the feet allowed to ride upon the carton, the tong bars dropping to the position shown in Figure 8, as soon as the carton clears. When the notched bar 216 drops, the latch 286 is freed from the notch 288, and the flap-closing lever arm 272 is allowed to return to the position shown in Figure 6.

As the filled carton moves forward with the carriage, the top and bottom flaps of either side pass through glue applicators mounted upon the transverse frame 48, the glue applicator for each upper flap comprising a pair of spaced guides 308 and 310, the guide 310 being adapted to cause the upper flap to pass over the resilient distortable tubular glue applicator 312 and be pressed thereagainst resiliently by the resilient finger 314. The lower flaps pass between guides 316 and 318 and beneath an applicator 320, such flap being held against the applicator by a finger 322, the parts being reversed in their relation to the applicators described for operation upon the upper flaps (see Figure 31).

It will be understood that before the carton reaches the applicator frame 48, the right hand lower flap emerges from beneath the flange 158 which terminates with the portion thereof acting as a filling apron. The left hand lower flap clears the end 155 of guide 156, while the carton is being expanded, and is allowed to spring back during filling to the horizontal position and is guided to the glue applicator by the flare of the guide 318.

While the flaps are traversing across the glue applicators 312 and 320, the spaced cams 324 and 326 on the carriage arm 202 (see Figure 12) actuate the glue pressure control valve 330, which applies pressure through an expansible bellows or flexible diaphragm 332 in the glue displacement chamber 334, whereupon glue is applied to the flaps in two stages, it being understood that the top and bottom flaps require glue thus disposed, since the forward and rear side flaps, when closed, are spaced from one another. The glue applicators in many respects may correspond to that shown in Patent No. 2,660,844 or copending application Serial No. 285,445 filed May 1, 1952, now Patent No. 2,765,769.

As the carton passes beyond the glue applicator frame, the top and bottom flaps engage converging guides 336 and 338, mounted upon the support member 340 extending from the transverse frame member 50. Similar guides are disposed on the left hand side of the machine, such guides being indicated as at 342, supported upon the member 344 (see Figure 1). It will be seen that the guides 336 and 338 not only converge toward one another, but that the guides 336 and 338 on the right hand side converge toward the similar guides indicated at 340 on the left hand side of the apparatus, so that as the carton is advanced, the laterally disposed top and bottom flaps to which glue has been applied on their under and upper respective faces, are caused to be formed to their closed position and the carton further advanced forward between the side guide rails 346 and 348 fixedly mounted on brackets such as 349 on the right hand side, and similar but laterally movable guide rails indicated as at 350 on the left hand side (see Figures 32, 33 and 34).

The left hand guide rails are secured to uprights such as 351 shown in conjunction with the frame 50. The upright slides on the lower cross member 353, and extends substantially to the upper cross member 355. Blocks such as 357 and 359 provide a groove for confining the rails from longitudinal movement along the length of the frame. The entrance ends of the rails 346, 348, and rails 350 are flared outwardly as at 361, and the upper rails are provided with hold down rollers 363 carried on pivotal arms 365, biased downwardly each by a tension spring 367.

The left hand guide rails are adapted to be moved laterally along their entire length by a plurality of cylinders such as 352 having piston rods or plungers 354 adapted to engage the side frame members 356. Such cylinders, when energized, cause the rails 350 to move toward the rails 346 and 348 to squeeze a carton or cartons therebetween and press the top and bottom flaps on either end against the side flaps. Such cylinders are activated to produce such pressure by being connected, as shown in Figure 23, to the return stroke end of the main carriage operating cylinder 68. Thus, while the carriage is being returned to select a further collapsed carton and while awaiting the start of the subsequent forward stroke, the cartons which have been filled and which have been advanced to a position between the rails 346 and 348 and 350 upon the conveyor 358 have their flaps under pressure, so that the glue may set. When the carriage moves through its forward stroke, the forward end of the cylinder 48 is exhausted and cylinders 352 are thereby vented, permitting the rails 350 to slide away from the rails 346 and 348. The cartons on the conveyor 358 may thus be moved forward without binding action of the flap pressure rails. In practice, the conveyor 358 is of sufficient length so that a series of cartons are upon the conveyor, the number of cartons being accommodated determining the sum total of increments of time during which pressure is applied to the flaps to set the glue. In practice, the length of the conveyor need not accommodate more than three or four cartons. The time factor will be affected by the length of time taken for the carriage to return to the end of its rearward movement, and until forward movement starts during all of which time, the cartons on the conveyor are subjected to glue setting pressure.

Referring to the diagrammatic showing of the pressure control system of Figure 23, it will be seen that there is a main air pressure line 360 having a branch 362 extending through a pressure reducing valve 364, to the cam-actuated glue control valve 330, the branch leading to the expansible chamber 334, as by the pipe line 336. Glue is supplied to the chamber under head pressure through a check valve 335, so that the displacement action of the flexible diaphragm therein, under the control of the pressure reducing valve 364 accurately controls the supply of glue to the glue applicators. The pressure supply line 360 is further connected through the valve 260 to the fluid pressure valve operators 262 and 264, as previously described. The operator 262 reverses the valve 266. The valve 266 is adapted to be actuated to the carrier return movement position by a valve actuator 368 moving with the piston rod 82 and carried on the shoe bracket 369, such valve being tripped when the piston rod 82 reaches the forward end of its stroke. The valve 266 is not actuated to the carrier forward movement position until the pressure operator 262 is activated through the shifting of the valve 260, which occurs at the end of the loading travel of the piston 255 of the loading cylinder 252. At this point valve 266 is operated by the operator 262, pressure being thus applied to effect a forward stroke of the piston in cylinder 68, and the carriage actuated thereby.

Figure 5:
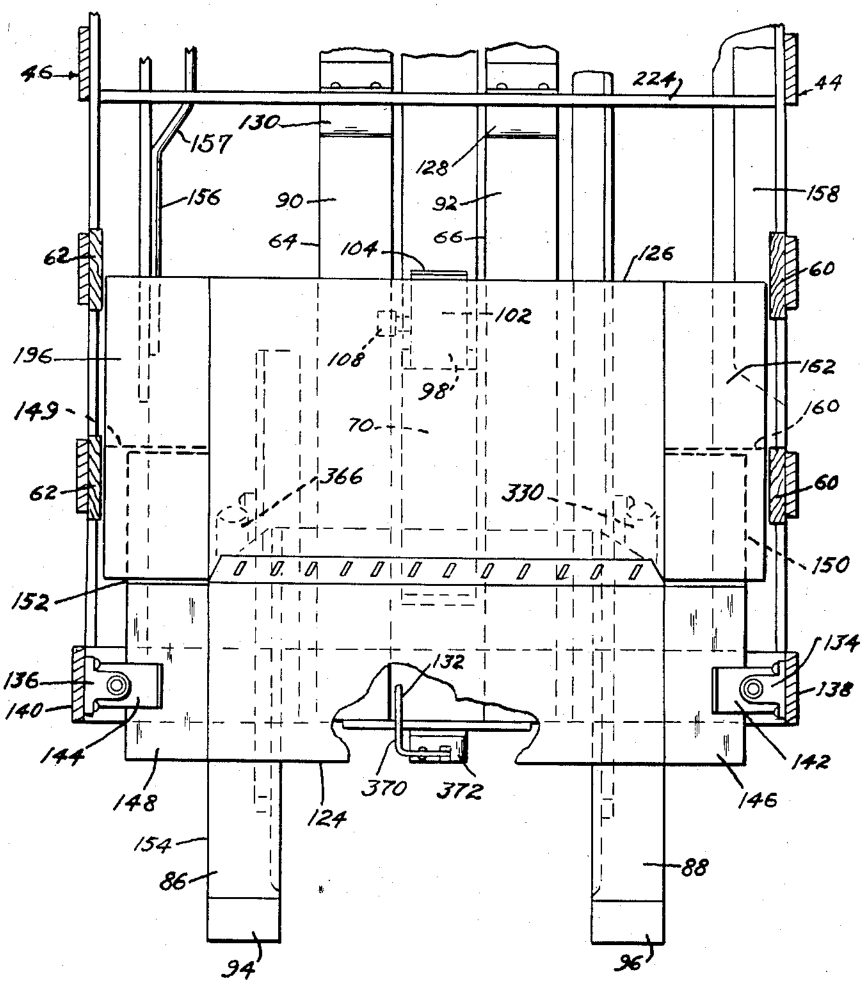
Figure 5 is a sectional view taken substantially on the line 5—5 of Figure 3, showing in plan view a carton in selected position with parts broken away.

It will be seen that if no carton is selected and moved to the position shown in Figure 5, the arm 132 of the lever 370 actuating valve 372 will not be depressed, and hence no air supply may reach the valve 250. Thus loading operation and loading stroke of the cylinder 255 is prevented, and since the forward motion of the carriage depends upon actuation of valve 260, and the power operator 262, the valve 266 will not be actuated so that forward carriage movement will be prevented.

To assure that the return movement of the loading piston is expedited, and not retarded by entrapped air in the end of the cylinder 255, a quick action exhaust valve 400 is placed in the pipe line 402, so that the outer end of the cylinder is free to exhaust. Further, in order to assure that the flap-breaking cylinders will be returned to inoperative position, prior to carton selection, a similar quick action exhaust valve 404 is placed in the line 406 so that upon the return stroke of the piston 69 in cylinder 68, the line will be fully open to exhaust entrapped air within the exhausting end of the cylinder 68.

It will be seen from the foregoing that through the instrumentality of a single reciprocating carriage operated by compressed air, and devices actuated by the carriage movement, a sequence of operations are performed by which collapsed cartons are selected, expanded, filled, and sealed ready for shipment. The air actuation provides a yielding cushion, providing gentle handling of the carton at the various stages. It will also be seen that the arrangement is such that the final operations are completed, while the advancing of the next collapsed carton is being effected, so that the operation is fast, with a minimum of lost time. Thus while the carriage is being returned, a carton is in readiness to be filled, filled cartons are under glue setting pressure and the next carton is being selected. At the completion of the return stroke, the load, if ready is immediately inserted into the carton ready for filling and the forward stroke commences. The forward stroke advances the next carton, while advancing the filled carton through the glue application stage. The speed of movement of the carriage can be controlled by pressure regulation as by a pressure control valve 407, and once such speed is set, the only possible delay which can occur in each complete cycle of operation occurs prior to the commencement of the forward stroke and would result from the inability of the loading mechanism to prepare a load for insertion into a carton within the time required for a forward and return stroke of the carriage. The carriage performs a sequence of operations on successive cartons in each single forward and return movement. The operations are positive, sequential and interdependent upon one another through carriage movement and without resort to timing devices, resulting in a compact space-saving apparatus of minimum overall length and high efficiency.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A carton selecting apparatus comprising an elongated bed having spaced carton-supporting rails, a hopper mounted above said bed at one end for receiving a stack of collapsed cartons with their flaps extending transversely of the bed, including means to support the forward edge of a lowermost carton within said hopper in spaced relation above said rails, a reciprocating carriage mounted for forward and return movement along said bed and movable beneath said hopper, collapsed carton selector means mounted on said carriage for embracing the forward edge of a collapsed carton within said hopper near the end of the return stroke for moving a collapsed carton rearwardly from the bottom of said stack and free of said support means, and collapsed carton-engaging shoulders mounted on said carriage rearwardly of said selector means for engaging the rearward edge of a selected collapsed carton and for moving said carton in the opposite direction from beneath said stack, and beneath said support means upon a forward stroke of the carriage.

2. A carton selecting apparatus comprising an elongated bed having spaced carton-supporting rails, a hopper mounted above said bed at one end for receiving a stack of collapsed cartons with their flaps extending transversely of the bed, including means to support the forward edge of a lowermost carton within said hopper in spaced relation above said rails, a reciprocating carriage mounted for forward and return movement along said bed and movable beneath said hopper, collapsed carton selector means mounted on said carriage for embracing the forward edge of a collapsed carton within said hopper near the end of the return stroke for moving a collapsed carton rearwardly from the bottom of said stack and free of said support means, and collapsed carton-engaging shoulders mounted on said carriage for engaging the rearward edge of a selected collapsed carton and for moving said carton in the opposite direction from beneath said stack, and beneath said support means upon a forward stroke of the carriage, a locating shoulder on one side of said carriage, means for initially bending the lower rearward flaps of the selected carton downward on the side of said shoulder, with one of said flaps disposed over said locating shoulder to form a locating flap, and guide means associated with said bed for holding said locating flap against said shoulder as the carriage moves forward through its stroke.

3. A carton selecting and expanding apparatus comprising an elongated bed having spaced carton-supporting rails, a hopper mounted above said bed at one end for receiving a stack of collapsed cartons with their flaps extending transversely of the bed, including means to support the forward edge of a lowermost carton within said hopper in spaced relation above said rails, a carton expanding mechanism associated with said bed adjacent said hopper, a reciprocating carriage mounted for forward and return movement along said bed and movable beneath and between said hopper and said expanding mechanism, collapsed carton selector means mounted on said carriage for embracing the forward edge of a collapsed carton within said hopper near the end of the return stroke for moving a collapsed carton rearwardly from the bottom of said stack, and free of said support means, collapsed carton-engaging shoulders mounted on said carriage for engaging the rearward edge of a selected collapsed carton and for moving said carton beneath said support means to the expanding mechanism upon a forward stroke of the carriage, a carton expanding tong forming part of said expanding mechanism pivotally supported above said bed and adapted to engage the forward edge of a collapsed carton as it approaches said expanding mechanism, and means for breaking the vacuum between the opposed facing surfaces of the collapsed carton as it approaches said expanding mechanism.

4. A carton selecting and expanding apparatus comprising an elongated bed having spaced carton-supporting rails, a hopper mounted above said bed at one end for receiving a stack of collapsed cartons with their flaps extending transversely of the bed, including means to support the forward edge of a lowermost carton within said hopper in spaced relation above said rails, a carton expanding mechanism associated with said bed adjacent said hopper, a reciprocating carriage mounted for forward and return movement along said bed and movable beneath and between said hopper and said expanding mechanism, collapsed carton selector means mounted on said carriage for embracing the forward edge of a collapsed carton within said hopper near the end of the return stroke for moving a collapsed carton rearwardly from the bottom of said stack, and free of said support means, collapsed carton-engaging shoulders mounted on said carriage for engaging the rearward edge of a selected collapsed carton, and for moving said carton beneath said support means to the expanding mechanism upon a forward stroke of the carriage, a locating shoulder on one side of said carriage, means for initially bending the lower rearward flaps of the selected carton downward on the side of said shoulder, with one of said flaps disposed over said locating shoulder to form a locating flap, guide means associated with said bed for holding said locating flap against said shoulder as the carriage moves forward through its stroke, a carton expanding tong forming a part of said expanding mechanism pivotally supported above said bed and adapted to engage the forward edge of a collapsed carton as it approaches said expanding mechanism, and means for breaking the vacuum between the opposed facing surfaces of the collapsed carton as it approaches said expanding mechanism.

5. A carton selecting and expanding apparatus comprising an elongated bed having spaced carton-supporting rails, a hopper mounted above said bed at one end for receiving a stack of collapsed cartons with their flaps extending transversely of the bed, including means to support the forward edge of a lowermost carton within said hopper in spaced relation above said rails, a carton expanding mechanism associated with said bed adjacent said hopper, a reciprocating carriage mounted for forward and return movement along said bed and movable beneath and between said hopper and said expanding mechanism, collapsed carton selector means mounted on said carriage for embracing the forward edge of a collapsed carton within said hopper near the end of the return stroke for moving a collapsed carton rearwardly from the bottom of said stack and free of said support means, collapsed carton-engaging shoulders mounted on said carriage for engaging the rearward edge of a selected collapsed carton and for moving said carton beneath said support means to the expanding mechanism upon a forward stroke of the carriage, a locating shoulder on one side of said carriage, means for initially bending the lower rearward flaps of the selected carton downward, with one of said flaps disposed over said locating shoulder to form a locating flap, guide means associated with said bed for holding said locating flap against said shoulder as the carriage moves forward through its stroke, a guide flange mounted on said bed extending along the other side of the path of travel of said carriage, means for initially guiding the other flap beneath said flange as said carriage moves forward, a carton expanding tong forming a part of said expanding mechanism pivotally supported above said bed and adapted to engage the forward edge of a collapsed carton as it approaches said expanding mechanism, and means actuated by the other flap for breaking the vacuum between the opposed facing surfaces of the collapsed carton as the carton approaches said expanding mechanism.

6. A carton selecting and expanding apparatus comprising an elongated bed having spaced carton supporting rails, a hopper mounted above said bed at one end for receiving a stack of collapsed cartons with their flaps extending transversely of the bed, including means to support the forward edge of a lowermost carton within said hopper in spaced relation above said rails, a carton expanding mechanism associated with said bed adjacent said hopper, a reciprocating carriage mounted for forward and return movement along said bed and movable beneath and between said hopper and said expanding mechanism, collapsed carton selector means mounted on said carriage for embracing the forward edge of a collapsed carton within said hopper near the end of the return stroke for moving a collapsed carton rearwardly from the bottom of said stack and free of said support means, collapsed carton-engaging shoulders mounted on said carriage for engaging the rearward edge of a selected collapsed carton and for moving said carton beneath said support means to the expanding mechanism upon a forward stroke of the carriage, a locating shoulder on one side of said carriage, means for initially bending the lower rearward flaps of the selected carton downward on the side of said shoulder, with one of said flaps disposed over said locating shoulder to form a locating flap, guide means associated with said bed for holding said locating flap against said shoulder as the carriage moves forward through its stroke, a carton expanding tong forming a part of said expanding mechanism pivotally supported above said bed and adapted to engage the forward edge of a collapsed carton as it approaches said expanding mechanism, and means actuated by the forward movement of the carriage toward the expanding mechanism for breaking the vacuum between facing opposed surfaces of the collapsed carton.

7. A carton selecting and expanding apparatus comprising an elongated bed having spaced carton-supporting rails, a hopper mounted above said bed at one end for receiving a stack of collapsed cartons with their flaps extending transversely of the bed, including means to support the forward edge of a lowermost carton within said hopper in spaced relation above said rails, a carton expanding mechanism associated with said bed adjacent said hopper, a reciprocating carriage mounted for forward and return movement along said bed and moveable beneath and between said hopper and said expanding mechanism, collapsed carton selector means mounted on said carriage for embracing the forward edge of a collapsed carton within said hopper near the end of the return stroke for moving a collapsed carton rearwardly from the bottom of said stack and free of said support means, collapsed carton engaging shoulders mounted on said carriage for engaging the rearward edge of a selected collapsed carton and for moving said carton beneath said support means to the expanding mechanism upon a forward stroke of the carriage, a carton expanding tong forming a part of said expanding mechanism pivotally supported above said bed and adapted to engage the forward edge of a collapsed carton as it approaches said expanding mechanism, and means actuated by the forward movement of the carriage toward the expanding mechanism for breaking the vacum between facing opposed surfaces of the collapsed carton.

8. A carton filling machine comprising an elongated bed having spaced carton-supporting rails, a hopper mounted above said bed at one end for receiving a stack of collapsed cartons with their flaps extending transversely of the bed, a carton expanding mechanism associated with said bed intermediate the ends thereof, a reciprocating carriage mounted for forward and return movement along said bed movable beneath and between said hopper and said expanding mechanism, collapsed carton selector means mounted on said carriage for gripping the forward edge of a collapsed carton within said hopper near the end of the return stroke for moving a collapsed carton rearwardly from the bottom of said stack, collapsed carton-engaging shoulders mounted on said carriage for engaging the rearward edge of a selected collapsed carton and for moving said carton to the expanding machanism upon a forward stroke of the carriage, a locating shoulder on one side of said carriage, means for initially bending the lower rearward flaps of the selected carton downward with one of said flaps disposed over said shoulder to form a locating flap, guide means associated with said bed for holding said locating flap against said shoulder as the carriage moves forward through its stroke, a guide flange mounted on said bed extending along the other side of the path of travel of said carriage, means for initially guiding the other flap beneath said flange as said carriage moves forward, a carton expanding tong pivotally supported above said bed and adapted to engage the forward edge of a collapsed carton as the carton approaches said expanding mechanism, and means for breaking the vacuum between the opposed facing surfaces of the collapsed carton as it approaches said expanding mechanism, whereby further forward movement of said carriage shoulders expands said carton to rectangular cross-section.

9. A carton selecting and expanding apparatus comprising an elongated bed having spaced carton-supporting rails, a hopper mounted above said bed at one end for receiving a stack of collapsed cartons with their flaps extending transversely of the bed, including means to support the forward edge of a lowermost carton within said hopper in spaced relation above said rails, a carton expanding mechanism associated with said bed adjacent said hopper, a reciprocating carriage mounted for forward and return movement along said bed and movable beneath and between said hopper and said expanding mechanism, collapsed carton selector means mounted on said carriage for embracing the forward edge of a collapsed carton within said hopper near the end of the return stroke for moving a collapsed carton rearwardly from the bottom of said stack and free of said support means, collapsed carton-engaging shoulders mounted on said carriage for engaging the rearward edge of a selected collapsed carton and for moving said carton beneath said support means to the expanding mechanism upon a forward stroke of the carriage, a locating shoulder on one side of said carriage, means for initially bending the lower rearward flaps of the selected carton downward, with one of said flaps disposed over said locating shoulder to form a locating flap, guide means associated with said bed for holding said locating flap against said shoulder as the carriage moves forward through its stroke, a guide flange mounted on said bed extending along the other side of the path of travel of said carriage, means for initially guiding the other flap beneath said flange as said carriage moves forward, a carton expanding tong forming a part of said expanding mechanism pivotally supported above said bed and adapted to engage the forward edge of a collapsed carton as it approaches said expanding mechnism, and means actuated by the other flap for breaking the vacuum between the opposed facing surfaces of the collapsed carton as the carton approaches said expanding mechanism, and means on said carriage for moving an expanded carton beyond said expanding mechanism while moving a subsequent collapsed carton to the expanding mechanism.

10. A carton selecting and expanding apparatus comprising an elongated bed having spaced carton-supporting rails, a hopper mounted above said bed at one end for receiving a stack of collapsed cartons with their flaps extending transversely of the bed, including means to support the forward edge of a lowermost carton within said hopper in spaced relation above said rails, a carton expanding mechanism associated with said bed adjacent said hopper, a reciprocating carriage mounted for forward and return movement along said bed and movable beneath and between said hopper and said expanding mechanism, collapsed carton selector means mounted on said carriage for embracing the forward edge of a collapsed carton within said hopper near the end of the return stroke for moving a collapsed carton rearwardly from the bottom of said stack and free of said support means, collapsed carton-engaging shoulders mounted on said carriage for engaging the rearward edge of a selected collapsed carton and for moving said carton beneath said support means to the expanding mechanism upon a forward stroke of the carriage, a locating shoulder on one side of said carriage, means for initially bending the lower rearward flaps of the selected carton downward on the side of said shoulder, with one of said flaps disposed over said locating shoulder to form a locating flap, guide means associated with said bed for holding said locating flap against said shoulder as the carriage moves forward through its stroke, a carton expanding tong forming a part of said expanding mechanism pivotally supported above said bed and adapted to engage the forward edge of a collapsed carton as it approaches said expanding mechanism, and means actuated by the forward movement of the carriage toward the expanding mechanism for breaking the vacuum between facing opposed surfaces of the collapsed carton, and means on said carriage for moving an expanded carton beyond said expanding mechanism while moving a subsequent collapsed carton to the expanding mechanism.

11. A carton selecting and expanding apparatus comprising an elongated bed having spaced carton-supporting rails, a hopper mounted above said bed at one end for receiving a stack of collapsed cartons with their flaps extending transversely of the bed, including means to support the forward edge of a lowermost carton within said hopper in spaced relation above said rails, a carton expanding mechanism associated with said bed adjacent said hopper, a reciprocating carriage mounted for forward and return movement along said bed and movable beneath and between said hopper and said expanding mechanism, collapsed carton selector means mounted on said carriage for embracing the forward edge of a collapsed carton within said hopper near the end of the return stroke for moving a collapsed carton rearwardly from the bottom of said stack and free of said support means, collapsed carton-engaging shoulders mounted on said carriage for engaging the rearward edge of a selected collapsed carton and for moving said carton beneath said support means to the expanding mechanism upon a forward stroke of the carriage, a carton expanding tong forming a part of said expanding mechanism pivotally supported above said bed and adapted to engage the forward edge of a collapsed carton as it approaches said expanding mechanism, and means actuated by the forward movement of the carriage toward the expanding mechanism for breaking the vacuum between facing opposed surfaces of the collapsed carton, and means on said carriage for moving an expanded carton beyond said expanding mechanism while moving a subsequent collapsed carton to the expanding mechanism.

12. A carton filling machine comprising an elongated bed having spaced carton-supporting rails, a hopper mounted above said bed at one end for receiving a stack of collapsed cartons with their flaps extending transversely of the bed, a carton expanding mechanism associated with said bed intermediate the ends thereof, a reciprocating carriage mounted for forward and return movement along said bed movable beneath and between said hopper and said expanding mechanism, collapsed carton selector means mounted on said carriage for gripping the forward edge of a collapsed carton within said hopper near the end of the return stroke for moving a collapsed carton rearwardly from the bottom of said stack, collapsed carton-engaging shoulders mounted on said carriage for engaging the rearward edge of a selected collapsed carton and for moving said carton to the expanding mechanism upon a forward stroke of the carriage, a locating shoulder on one side of said carriage, means for initially bending the lower rearward flaps of the selected carton downward, with one of said flaps disposed over said shoulder to form a locating flap, guide means associated with said bed for holding said locating flap against said shoulder as the carriage moves forward through its stroke, a guide flange mounted on said bed extending along the other side of the path of travel of said carriage, means for initially guiding the other flap beneath said flange as said carriage moves forward, a carton expanding tong pivotally supported above said bed and adapted to engage the forward edge of a collapsed carton as the carton approaches said expanding mechanism, means for breaking the vacuum between the opposed facing surfaces of the collapsed carton as it approaches said expanding mechanism, whereby further forward movement of said carriage shoulders expands said carton to rectangular cross-section, and means on said carriage, retractable on return movement, and adapted to advance an expanded carton beyond said expanding mechanism upon a subsequent forward movement of said carriage.

13. A carton expanding apparatus comprising a bed having a pair of rails, a carriage adapted to reciprocate along said bed and having collapsed carton-pushing shoulders, an opening tong pivotally supported above said bed and adapted to engage the forward edge of a collapsed carton and arrest forward movement thereof, and adapted to be lifted by an expanding carton while said carriage moves into carton-expanded position, a carton side flap closing arm pivotally mounted with respect to said bed and biased to a non-operative position, means actuated by said carriage for swinging said arm to flap-closing position, and for subsequently advancing said carton, and means actuated by the carriage for lifting said tong clear of an expanded carton while the carton advances thereunder.

14. A carton expanding apparatus comprising a bed having a pair of rails, a carriage adapted to reciprocate along said bed and having collapsed carton-pushing shoulders, an opening tong pivotally supported above said bed and adapted to engage the forward edge of a collapsed carton and arrest forward movement thereof, and adapted to be lifted by an expanding carton while said carriage moves into carton-expanded position, a carton side flap closing arm pivotally mounted with respect to said bed and biased to a non-operative position, means actuated by said carriage for swinging said arm to flap-closing position, and for subsequently advancing said carton, means actuated by the carriage for lifting said tong clear of an expanded carton while the carton advances thereunder, and means for holding said arm in flap-closing position during advancement of said carton, and for releasing said arm when said carton has advanced substantially out of the range thereof.

15. A carton expanding apparatus comprising a bed having a pair of rails, a carriage adapted to reciprocate along said bed and having collapsed carton-pushing shoulders, an opening tong pivotally supported above said bed and adapted to engage the forward edge of a collapsed carton and arrest forward movement thereof, and adapted to be lifted by an expanding carton while said carriage moves into carton expanded position, means for reversing the movement of said carriage, and for closing the side flaps on one side end of the expanded carton, a carton opposite side end rear flap-closing arm pivotally mounted with respect to said bed and biased to a non-operative position, means actuated by said carriage on its subsequent forward movement for swinging said arm to flap-closing position, and for subsequently advancing said carton, and means actuated by the carriage for lifting said tong clear of an expanded carton while the carton advances thereunder.

16. A carton expanding apparatus comprising a bed having a pair of rails, a carriage adapted to reciprocate along said bed and having collapsed carton-pushing shoulders, an opening tong pivotally supported above said bed and adapted to engage the forward edge of a collapsed carton and arrest forward movement thereof, and adapted to be lifted by an expanding carton while said carriage moves into carton expanded position, means for reversing the movement of said carriage, and for closing the side flaps on one side end of the expanded carton, a carton opposite side end rear flap-closing arm pivotally mounted with respect to said bed and biased to a non-operative position, means actuated by said carriage on its subsequent forward movement for swinging said arm to flap-closing position, and for subsequently advancing said carton, means actuated by the carriage for lifting said tong clear of an expanded carton while the carton advances thereunder, means for holding said arm in flap-closing position during advancement of said carton, and for releasing said arm when said carton has advanced beyond the range thereof, and means responsive to the advancing movement of said carton for closing the remaining forward side flap.

17. A carton selecting apparatus comprising an elongated bed having spaced carton-supporting rails, a hopper mounted above said bed at one end for receiving a stack of collapsed cartons with their flaps extending transversely of the bed, including means to support the forward edge of a lowermost carton within said hopper in spaced relation of said rails, a carton expanding mechanism associated with said bed intermediate the ends thereof, a reciprocating carriage mounted for forward and return movement along said bed and movable beneath and between said hopper and said expanding mechanism, collapsed carton selector means mounted on said carriage for embracing the forward edge of a collapsed carton within said hopper near the end of the return stroke for moving a collapsed carton rearwardly from the bottom of said stack, and free of said support means, collapsed carton-engaging shoulders mounted on said carriage for engaging the rearward edge of a selected collapsed carton and for moving said carton in the opposite direction from beneath the stack to the expanding station upon a forward stroke of the carriage, and means for retracting said selector means upon the initial portion of the return stroke of said carriage.

18. In a carton-handling apparatus, an elongated bed, a carriage adapted to be reciprocated along said bed, a carton hopper above said bed at one end, carton expanding mechanism associated with said bed to expand a carton with an open end facing laterally and operable by movement of said carrier, carton-filling mechanism associated with said bed and laterally disposed with reference thereto and adjacent said expanding mechanism, means on said carriage for advancing a filled carton beyond said filling mechanism while actuating said expander mechanism, fluid pressure means for moving said carriage through a forward stroke and followed by a return stroke, means associated with said carriage for selecting a carton from said hopper on the return stroke of said carriage, means responsive to the presence of a selected carton for initiating operation of said carton-filling mechanism, and means responsive to completion of the operation of said filling mechanism to initiate forward movement of said carriage whereby to advance a filled carton and expand a selected carton.

19. In a carton-handling apparatus, an elongated bed, a carriage adapted to be reciprocated along said bed, a carton hopper above said bed at one end, carton-filling mechanism associated with said bed, fluid pressure means for moving said carriage through a forward stroke and followed by a return stroke, means associated with said carriage for selecting a carton from said hopper on the return stroke of said carriage, means responsive to the presence of a selected carton for initiating operation of said carton-filling mechanism, and means responsive to completion of the operation of said filling mechanism to initiate forward movement of said carriage.

20. In a carton-handling apparatus, an elongated bed, a carriage adapted to be reciprocated along said bed, a carton hopper above said bed at one end, carton expanding mechanism associated with said bed to expand a carton with an open end facing laterally and operable by movement of said carrier, carton-filling mechanism associated with said bed and laterally disposed with reference thereto and adjacent said expanding mechinism, carriage-controlled glue applying means for applying glue to the flaps of filled cartons mounted on said bed beyond said expanding mechanism, means on said carriage for advancing a filled carton beyond said filling mechanism and through said glue applying means, while actuating said expander mechanism upon a subsequent carton, fluid pressure means for moving said carriage through a forward stroke and followed by a return stroke, means associated with said carriage for selecting a carton from said hopper on the return stroke of said carriage, means responsive to the presence of a selected carton for initiating operation of said carton-filling mechanism, and means responsive to completion of the operation of said filling mechanism to initiate forward movement of said carriage whereby to advance a filled carton and expand a selected carton.

21. In a carton-handling apparatus, an elongated bed, a carriage adapted to be reciprocated along said bed, a carton hopper above said bed at one end, carton expanding mechanism associated with said bed to expand a carton with an open end facing laterally and operable by movement of said carrier, carton-filling mechanism associated with said bed and laterally disposed with reference thereto and adajacent said expanding mechanism, carriage-controlled glue applying means for applying glue to the flaps of filled cartons mounted on said bed beyond said expanding mechanism, means on said carriage for advancing a filled carton beyond said filling mechanism and through said glue applying means while actuating said expander mechanism upon a subsequent carton, fluid pressure means for moving said carriage through a forward stroke and followed by a return stroke, means associated with said carriage for selecting a carton from said hopper on the return stroke of said carriage, means responsive to the presence of a selected carton for initiating operation of said carton-filling mechanism, means responsive to completion of the operation of said filling mechanism to initiate forward movement of said carriage whereby to advance a filled carton through said glue applying means and expand a selected carton, means for forming said flaps to carton-closed position, and means responsive to pressure in said fluid pressure means on the return stroke thereof for applying glue setting pressure to said flaps.

22. In a carton-handling apparatus, an elongated bed, a carriage adapted to be reciprocated along said bed, a carton hopper mounted above said bed at one end, carton expanding mechanism associated with said bed to expand a carton with an open end facing laterally and operable by movement of said carrier, means on said carriage for advancing a filled carton beyond said expanding mechanism while actuating said expander mechanism upon a subsequent collapsed carton, fluid pressure means for moving said carriage through a forward stroke and followed by a return stroke, and means associated with said carriage for selecting a collapsed carton from said hopper on the return stroke of said carriage.

23. In a carton-handling apparatus, an elongated bed, a carriage adapted to be reciprocated along said bed, a carton hopper mounted above said bed at one end, carton expanding mechanism associated with said bed operable by movement of said carrier and adapted to expand a carton with an open end facing laterally, means on said carriage for advancing a filled carton beyond said expanding mechanism while actuating said expander mechanism upon a subsequent collapsed carton, fluid pressure means for moving said carriage through a forward stroke and followed by a return stroke, and pressure means mounted on said bed and associated with said carriage fluid pressure means for applying glue setting pressure to a filled carton during a return stroke of said carriage.

References Cited in the file of this patent

UNITED STATES PATENTS

| | | |
|---|---|---|
| 2,050,547 | Thayer | Aug. 11, 1936 |
| 2,280,773 | Ferguson | Apr. 28, 1942 |
| 2,539,652 | Amberg | Jan. 30, 1951 |